(12) United States Patent
Okuoka et al.

(10) Patent No.: US 12,523,854 B2
(45) Date of Patent: Jan. 13, 2026

(54) ZOOM LENS AND IMAGE PICKUP APPARATUS HAVING THE SAME

(71) Applicant: CANON KABUSHIKI KAISHA, Tokyo (JP)

(72) Inventors: Shinya Okuoka, Tochigi (JP); Makoto Nakahara, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 497 days.

(21) Appl. No.: 18/063,112

(22) Filed: Dec. 8, 2022

(65) Prior Publication Data

US 2023/0213738 A1  Jul. 6, 2023

(30) Foreign Application Priority Data

Jan. 1, 2022  (JP) .................................. 2022-000019

(51) Int. Cl.
*G02B 13/00* (2006.01)
*G02B 9/62* (2006.01)
*G02B 13/02* (2006.01)

(52) U.S. Cl.
CPC ............. *G02B 13/009* (2013.01); *G02B 9/62* (2013.01); *G02B 13/0045* (2013.01); *G02B 13/02* (2013.01)

(58) Field of Classification Search
CPC .............. G02B 13/009; G02B 13/0045; G02B 13/02; G02B 9/62; G02B 5/143507; G02B 5/144; G02B 5/1445; G02B 5/144503; G02B 5/144507; G02B 5/144511; G02B 5/144515; G02B 5/145; G02B 5/1455; G02B 5/145503; G02B 5/145507; G02B 5/145511; G02B 5/145515;
(Continued)

(56) References Cited

U.S. PATENT DOCUMENTS 9,219,864 B2   12/2015  Nakahara
9,377,606 B2    6/2016  Nakahara
(Continued)

FOREIGN PATENT DOCUMENTS

JP    2002-14284 A    1/2002
JP    2003-057547 A   2/2003
(Continued)

OTHER PUBLICATIONS

Translation of WO202100257 already on record (Year: 2021).*
(Continued)

*Primary Examiner* — Travis S Fissel
(74) *Attorney, Agent, or Firm* — Carter, DeLuca & Farrell LLP

(57) ABSTRACT

A zoom lens includes, in order from an object side to an image side, a first lens unit having negative refractive power, a second lens unit having positive refractive power, and a rear unit including one or more lens units. A distance between adjacent lens units changes during zooming. The rear unit includes a focus lens unit having positive refractive power and configured to move from the image side to the object side during focusing from infinity to a short-distance end. The first lens unit includes, in order from the object side to the image side, a first negative lens and a second negative lens. A predetermined condition is satisfied.

24 Claims, 13 Drawing Sheets

(58) Field of Classification Search
CPC ........ G02B 5/145519; G02B 5/145523; G02B 5/145527; G02B 5/145531; G02B 5/146; G02B 5/15
USPC .......................................................... 359/676
See application file for complete search history.

(56) References Cited

U.S. PATENT DOCUMENTS

| | | | |
|---|---|---|---|
| 9,500,842 B2 | 11/2016 | Nakahara | |
| 10,268,104 B2 | 4/2019 | Nakahara | |
| 10,585,268 B2 | 3/2020 | Okuoka | |
| 10,718,929 B2 | 7/2020 | Saito et al. | |
| 10,754,131 B2 | 8/2020 | Nakahara | |
| 10,802,246 B2 | 10/2020 | Okuoka | |
| 10,935,755 B2 | 3/2021 | Saito et al. | |
| 2007/0127136 A1* | 6/2007 | Saori | G02B 15/144515 359/680 |
| 2014/0160342 A1* | 6/2014 | Misaka | G02B 13/009 359/683 |
| 2021/0033835 A1 | 2/2021 | Nakahara | |
| 2022/0214530 A1 | 7/2022 | Nakahara et al. | |
| 2022/0334363 A1 | 10/2022 | Okuoka et al. | |
| 2023/0213739 A1 | 7/2023 | Nakahara | |

FOREIGN PATENT DOCUMENTS

| | | |
|---|---|---|
| JP | 2007-114727 A | 5/2007 |
| JP | 2010-152316 A | 7/2010 |
| JP | 2011-059495 A | 3/2011 |
| JP | 2016-075742 A | 5/2016 |
| JP | 2017-122746 A | 7/2017 |
| JP | 2019-040029 A | 3/2019 |
| WO | WO-2021200257 A1 * | 10/2021 |

OTHER PUBLICATIONS

Notice of Reasons for Refusal issued by the Japanese Patent Office on Feb. 6, 2024 in corresponding JP Patent Application No. 2022-00019, with English translation.

* cited by examiner

ZOOM LENS AND IMAGE PICKUP APPARATUS HAVING THE SAME

BACKGROUND

Technical Field

One of the aspects of the disclosure relates to a zoom lens, which is suitable for an image pickup apparatus using a solid-state image sensor such as a digital still camera, a digital video camera, a broadcasting camera, and a surveillance camera, and an image pickup apparatus such as a film-based camera.

Description of the Related Art

A zoom lens for an image pickup apparatus is demanded for a wide angle of view, and a small and lightweight configuration. A so-called negative lead type zoom lens is known as a wide-angle zoom lens, in which a lens unit having negative refractive power is disposed closest to an object.

An outer diameter of the lens unit disposed closest to the object is determined by an off-axis light beam (luminous flux) at the wide-angle end. Thus, the lens unit disposed closest to the object tends to be larger and heavier than other lens units. Since an off-axis light beam at the wide-angle end has a large incident height in that lens unit, off-axis aberrations such as curvature of field and distortion are likely to occur. It is important for the negative lead type zoom lens to properly set the configuration of the first lens unit in order to achieve high optical performance in the small and lightweight configuration.

Japanese Patent Laid-Open No. ("JP") 2019-040029 discloses a zoom lens that includes, in order from the object side to the image side, a first lens unit having negative refractive power, a second lens unit having positive refractive power, a third lens unit having negative refractive power, and a fourth lens unit having positive refractive power.

The zoom lens disclosed in JP 2019-040029 is small and lightweight, but cannot satisfactorily correct various aberrations and has insufficient optical performance.

SUMMARY

One of the aspects of the disclosure provides a small and lightweight zoom lens having high optical performance, an image pickup apparatus, and an imaging system.

A zoom lens according to one aspect of the disclosure includes, in order from an object side to an image side, a first lens unit having negative refractive power, a second lens unit having positive refractive power, and a rear unit including one or more lens units. A distance between adjacent lens units changes during zooming. The rear unit includes a focus lens unit having positive refractive power and configured to move from the image side to the object side during focusing from infinity to a short-distance end. The first lens unit includes, in order from the object side to the image side, a first negative lens and a second negative lens. The following inequalities are satisfied:

$0 < fG1/fG2 < 0.42$ $1.40 < ndG1 < 1.69$ where fG1 is a focal length of the first negative lens, fG2 is a focal length of the second negative lens, and ndG1 is a refractive index of the first negative lens.

An image pickup apparatus having the above zoom lens and an imaging system having the above zoom lens also constitute another aspect of the disclosure.

Further features of the disclosure will become apparent from the following description of exemplary embodiments with reference to the attached drawings.

DESCRIPTION OF THE EMBODIMENTS

Figure 1:
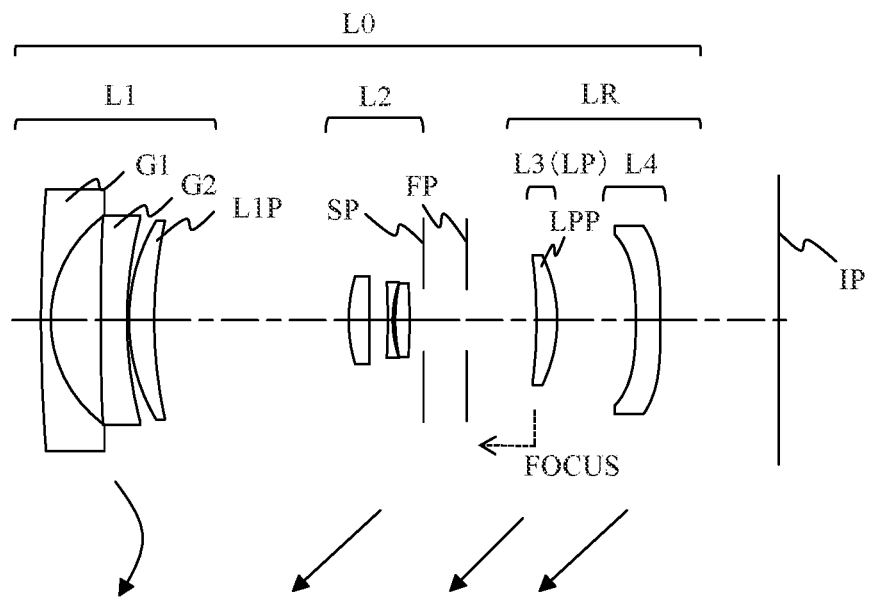
FIG. 1 is a lens sectional view of the zoom lens according to Example 1.
Figure 2A:
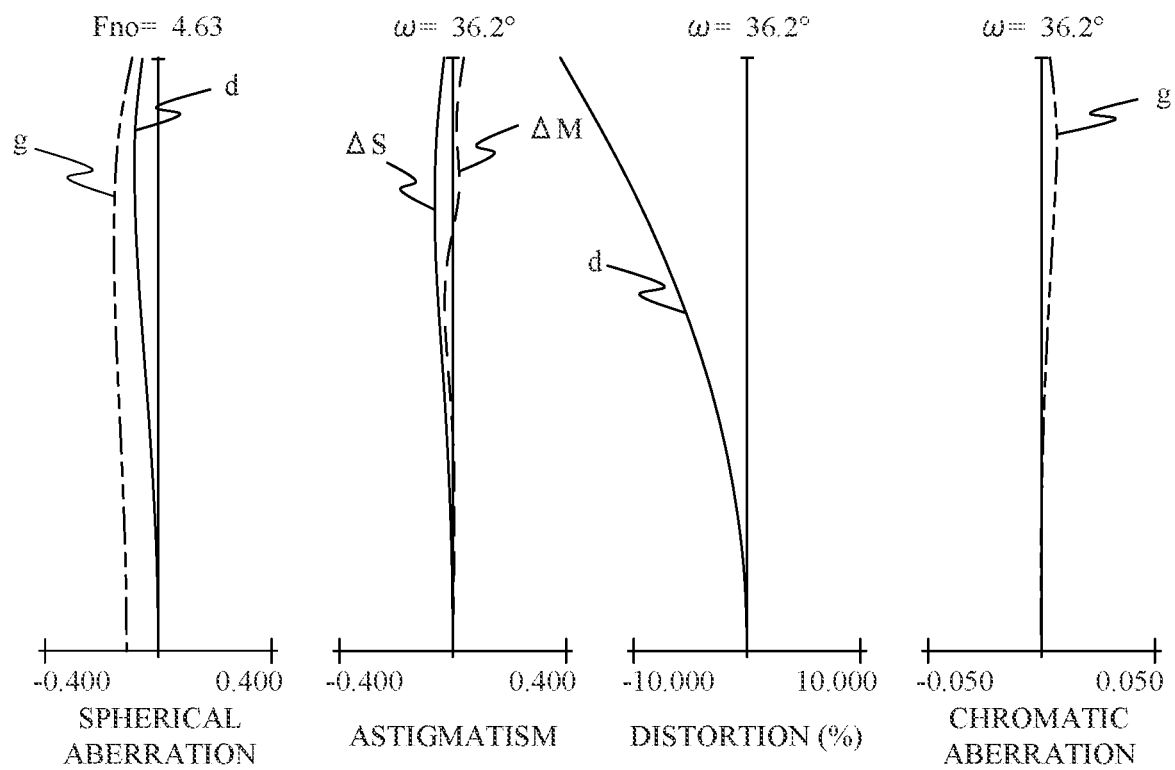
FIGS. 2A to 2C are aberration diagrams of the zoom lens according to Example 1.
Figure 2B:
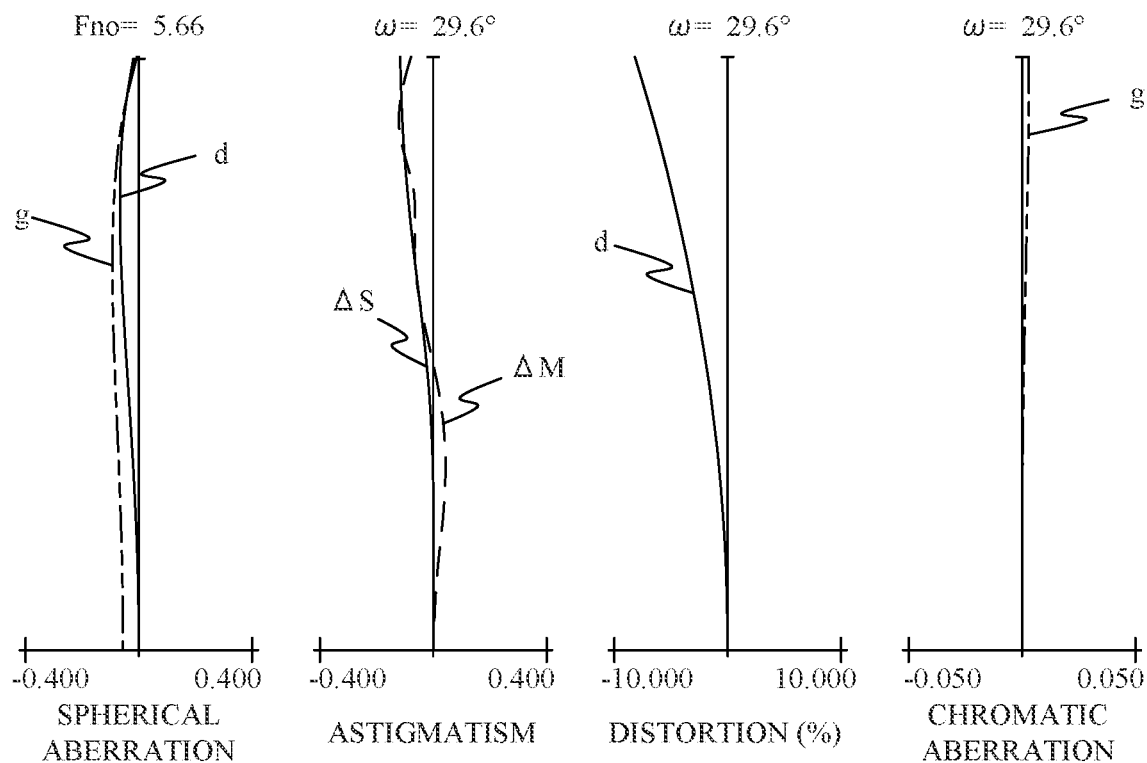
Figure 2C:
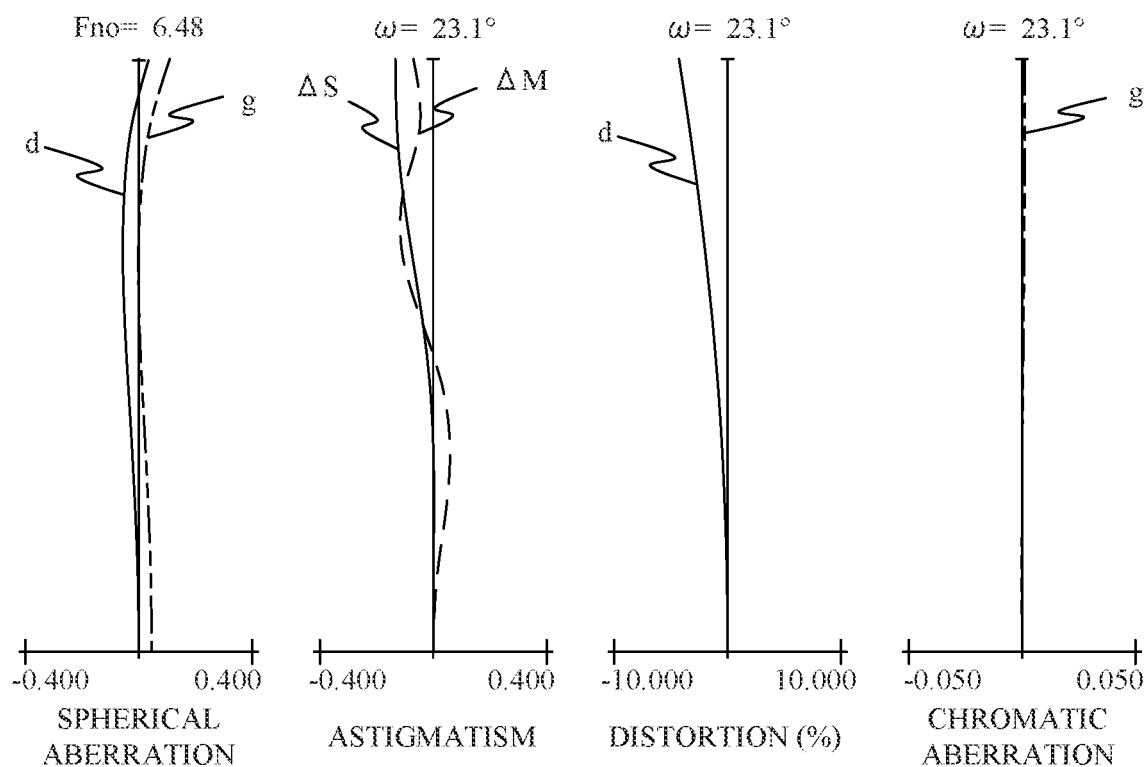
Figure 3:
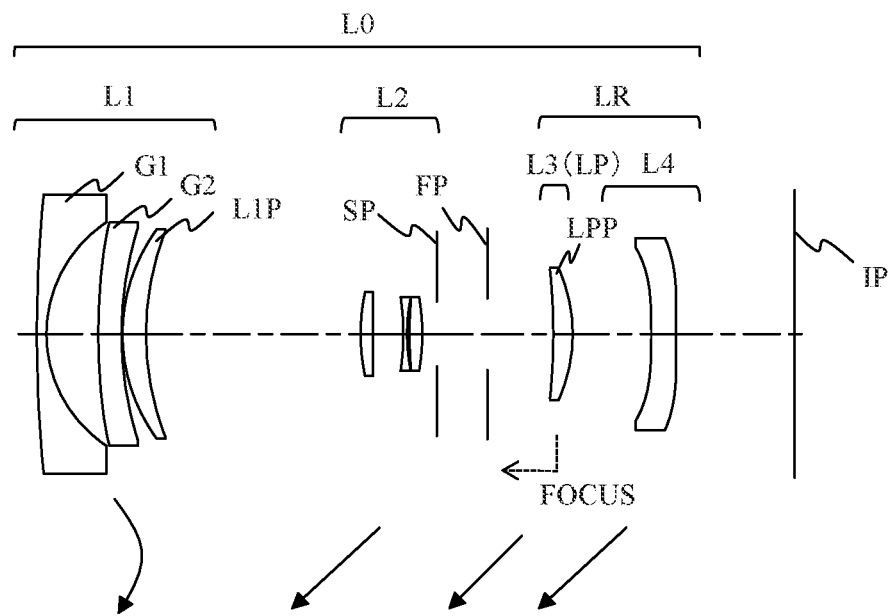
FIG. 3 is a lens sectional view of a zoom lens according to Example 2.
Figure 4A:
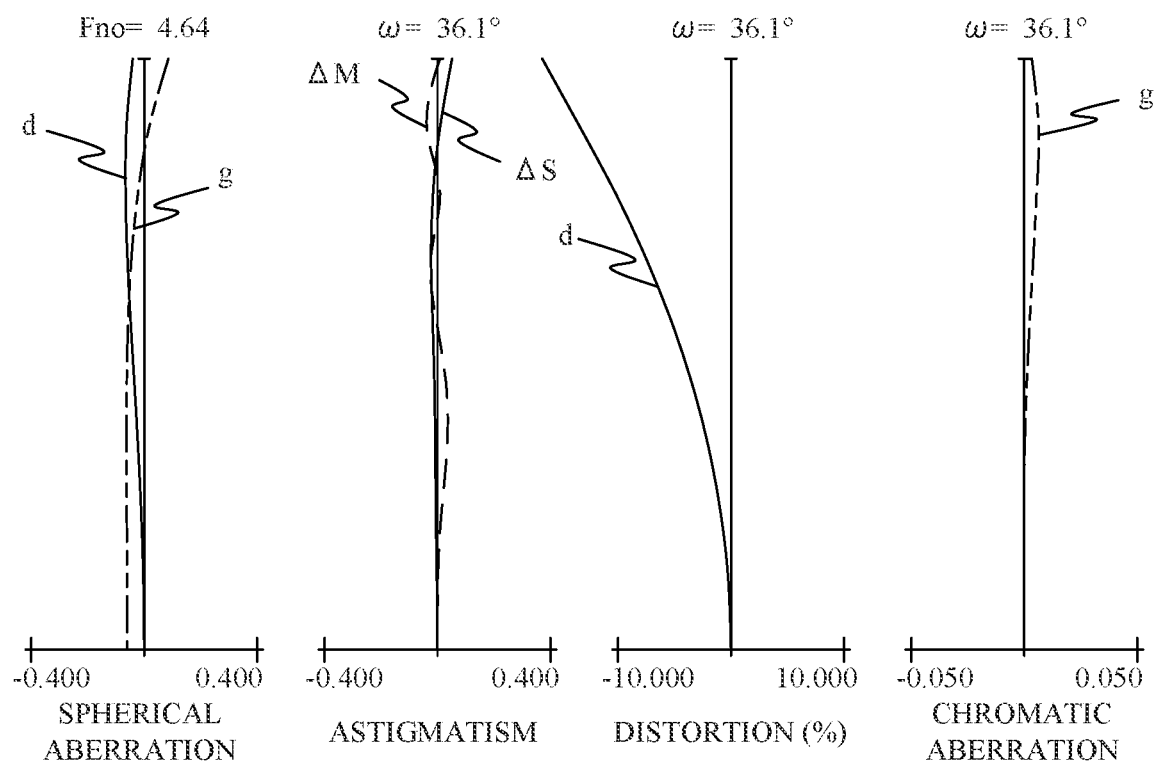
FIGS. 4A to 4C are aberration diagrams of the zoom lens according to Example 2.
Figure 4B:
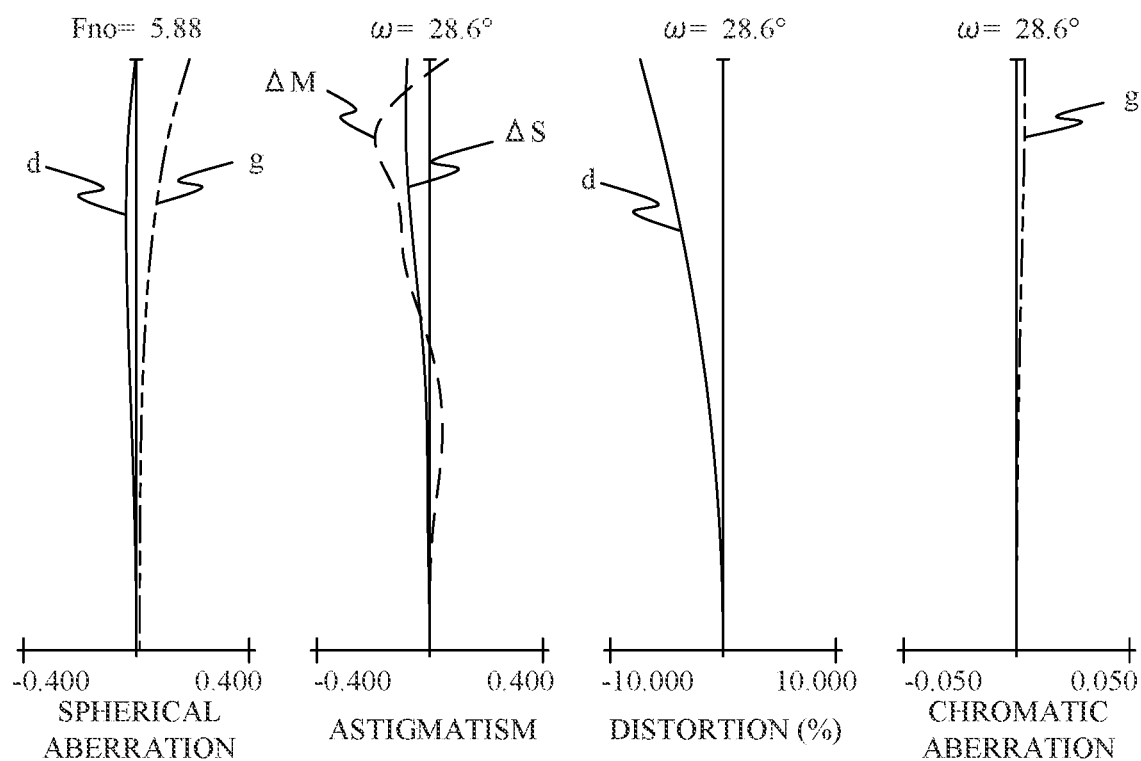
Figure 4C:
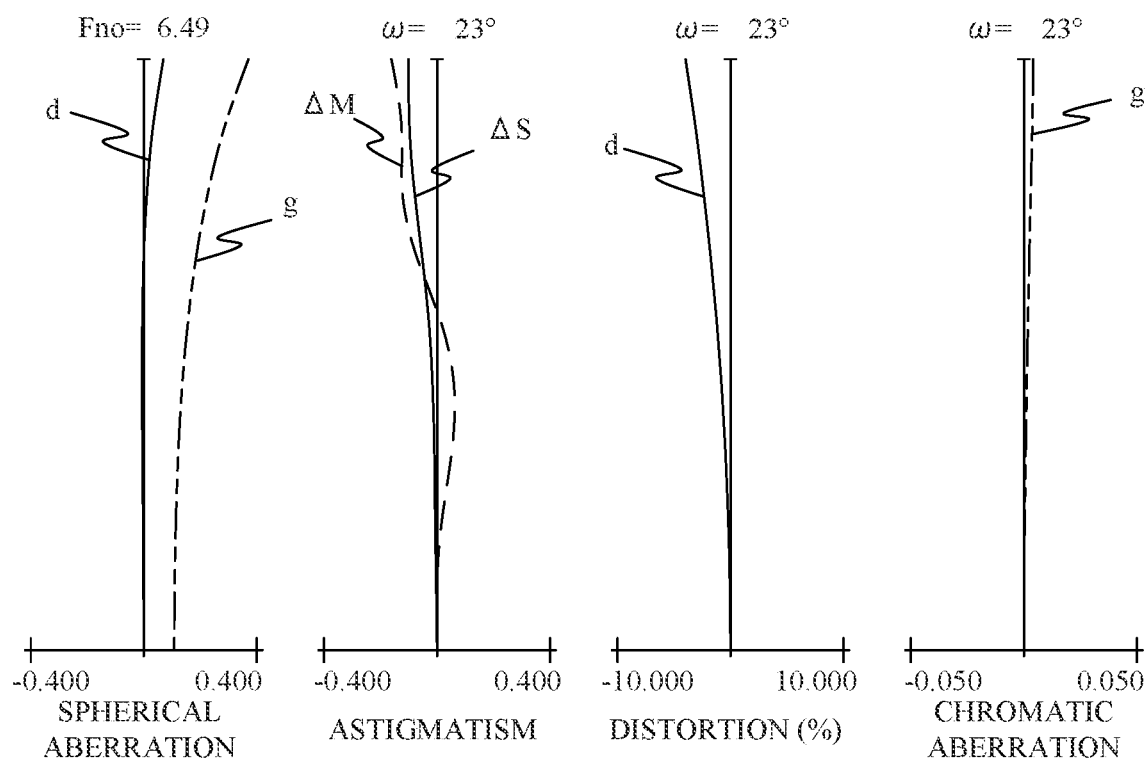
Figure 5:
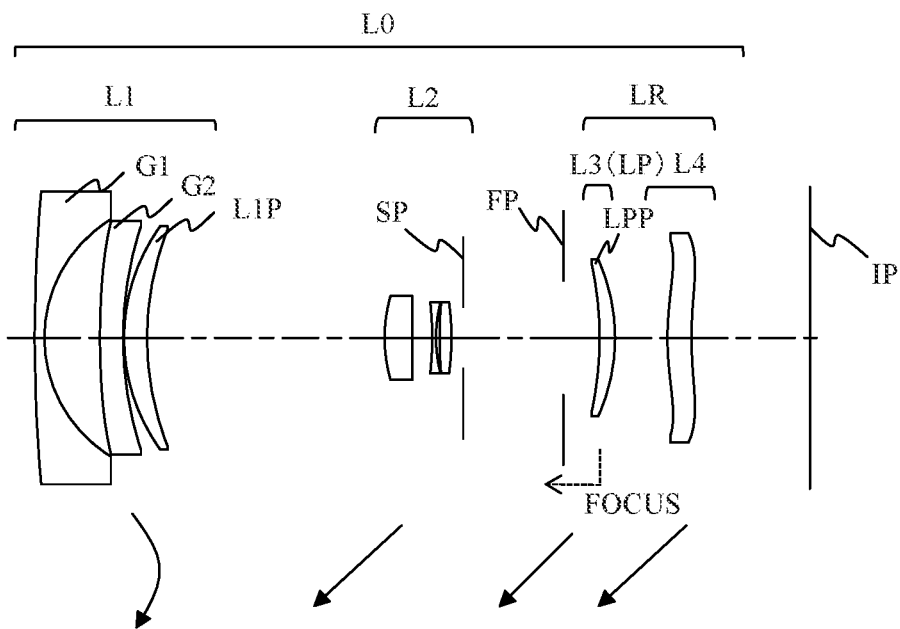
FIG. 5 is a lens sectional view of a zoom lens according to Example 3.
Figure 6A:
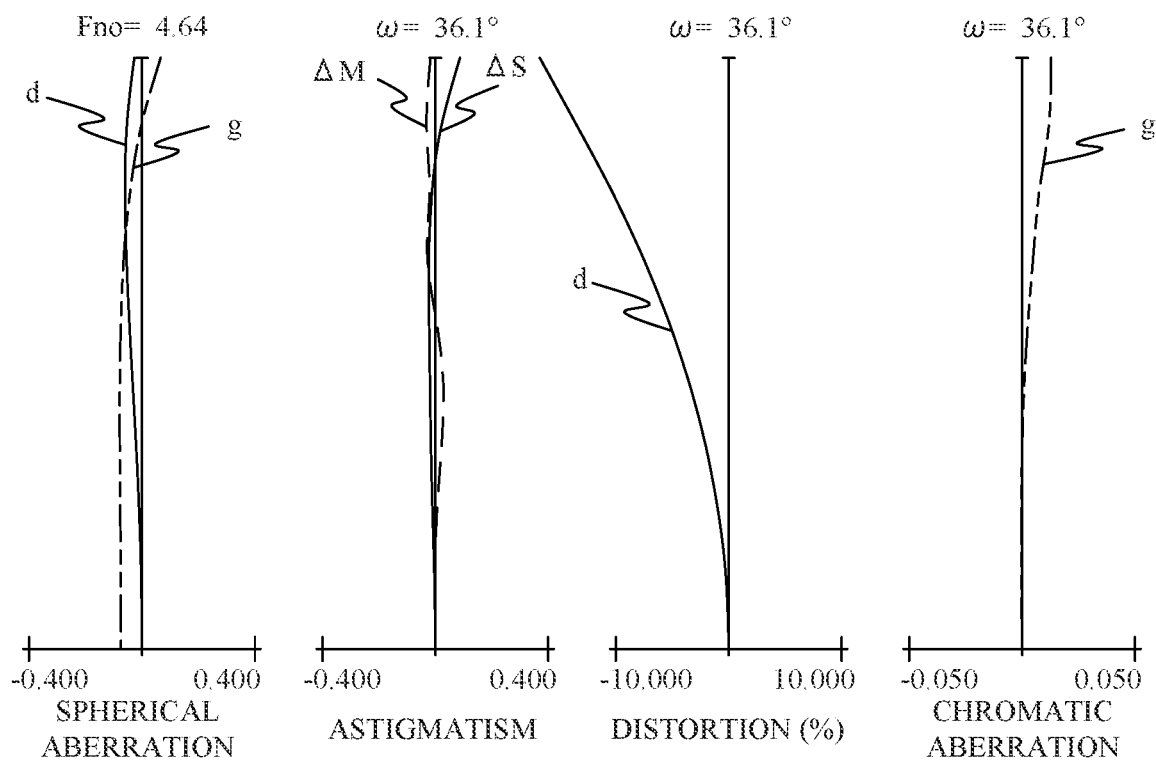
FIGS. 6A to 6C are aberration diagrams of the zoom lens according to Example 3.
Figure 6B:
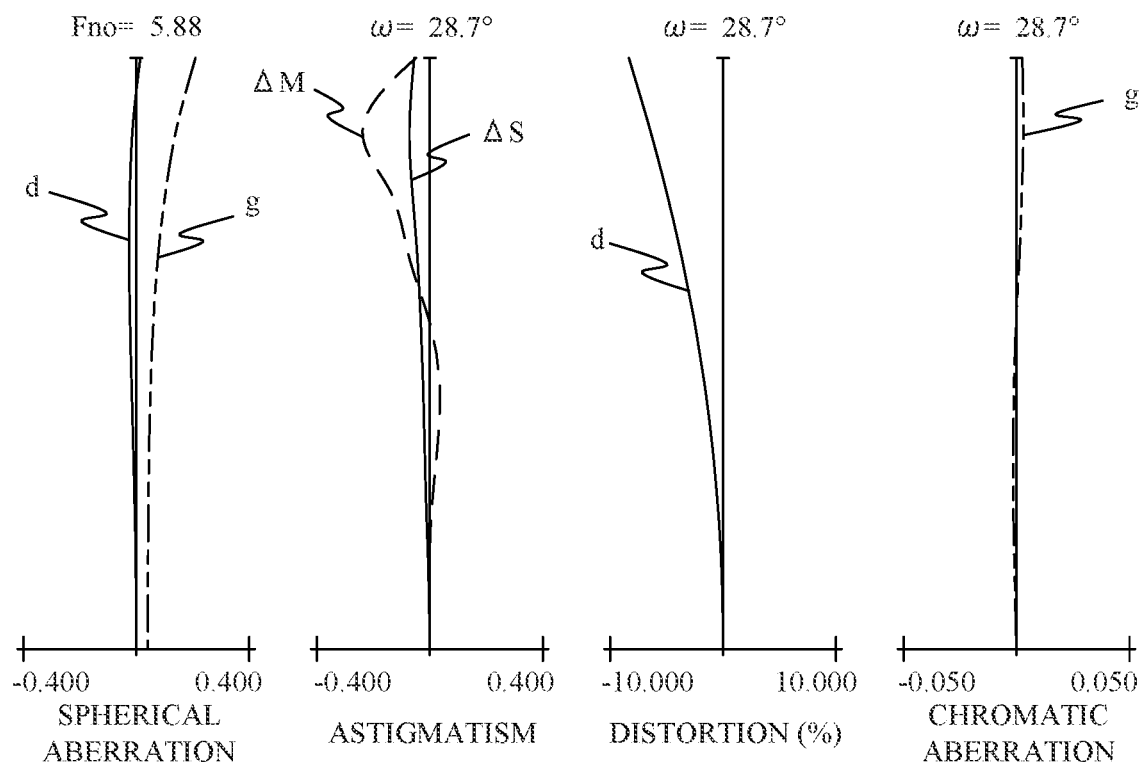
Figure 6C:
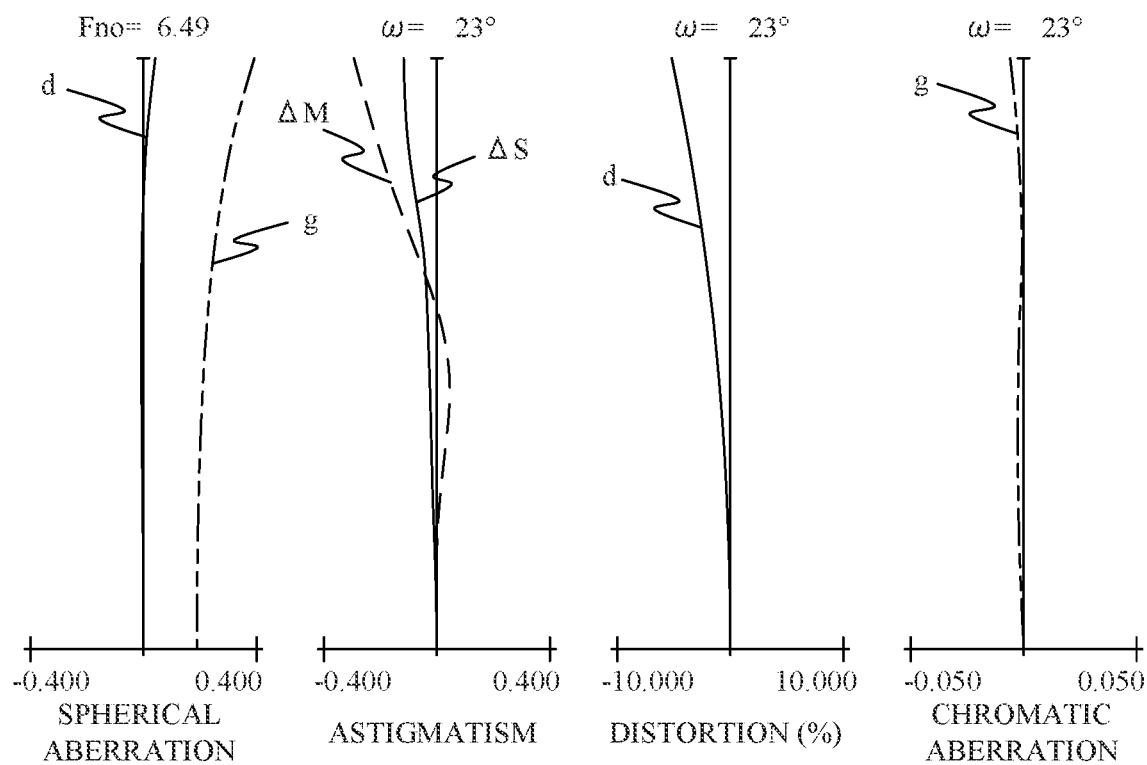
Figure 7:
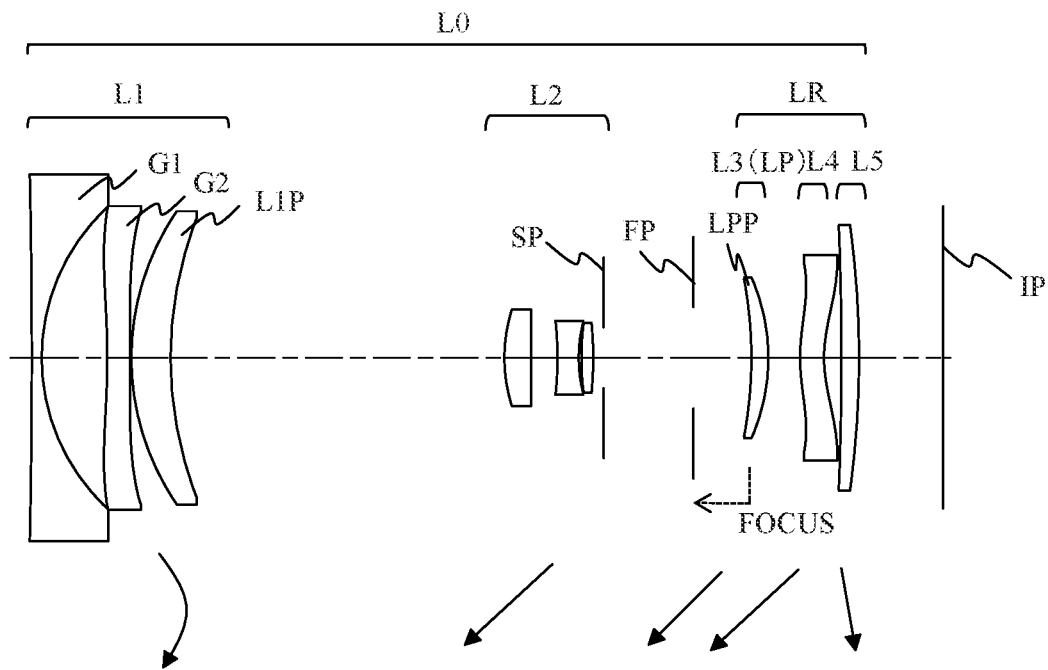
FIG. 7 is a lens sectional view of a zoom lens according to Example 4.
Figure 8A:
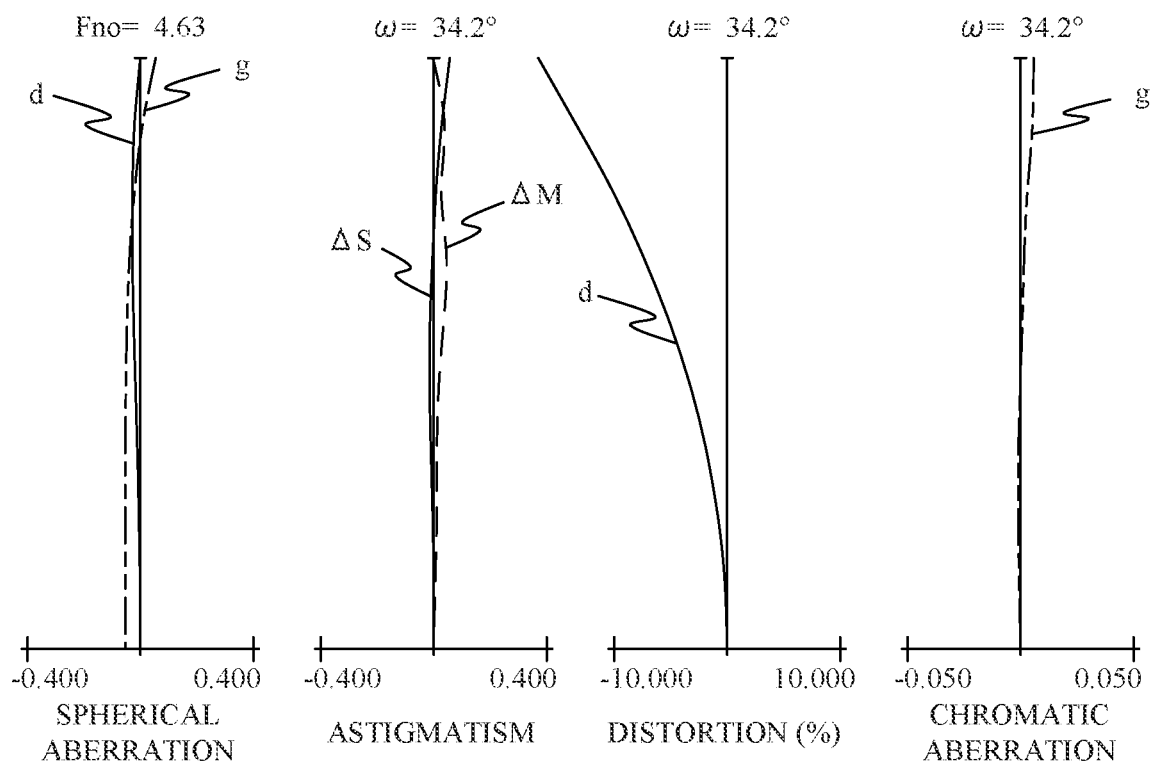
FIGS. 8A to 8C are aberration diagrams of the zoom lens according to Example 4.
Figure 8B:
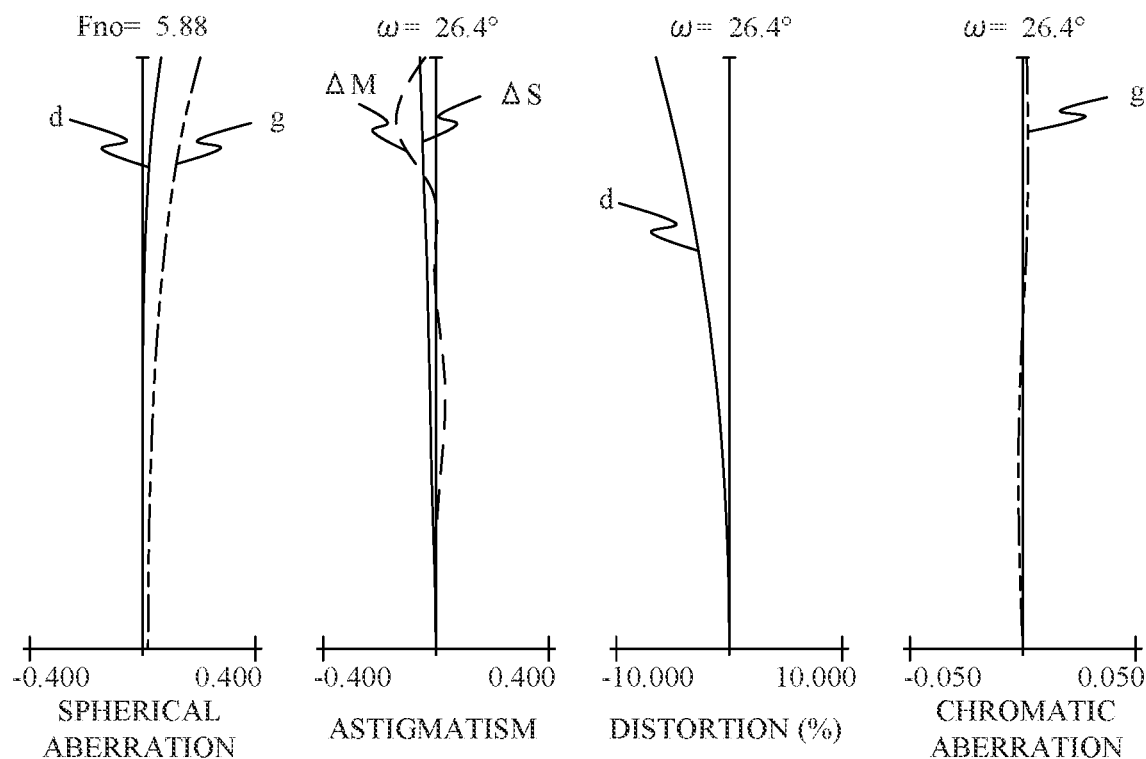
Figure 8C:
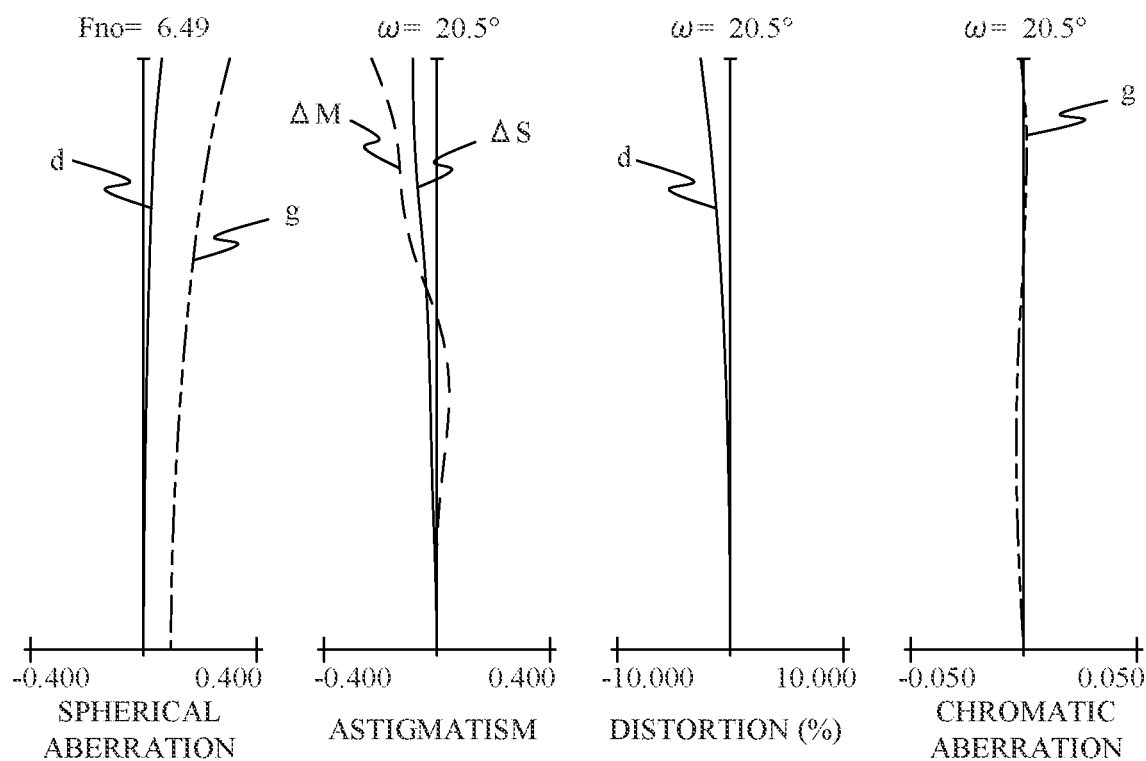
Figure 9:
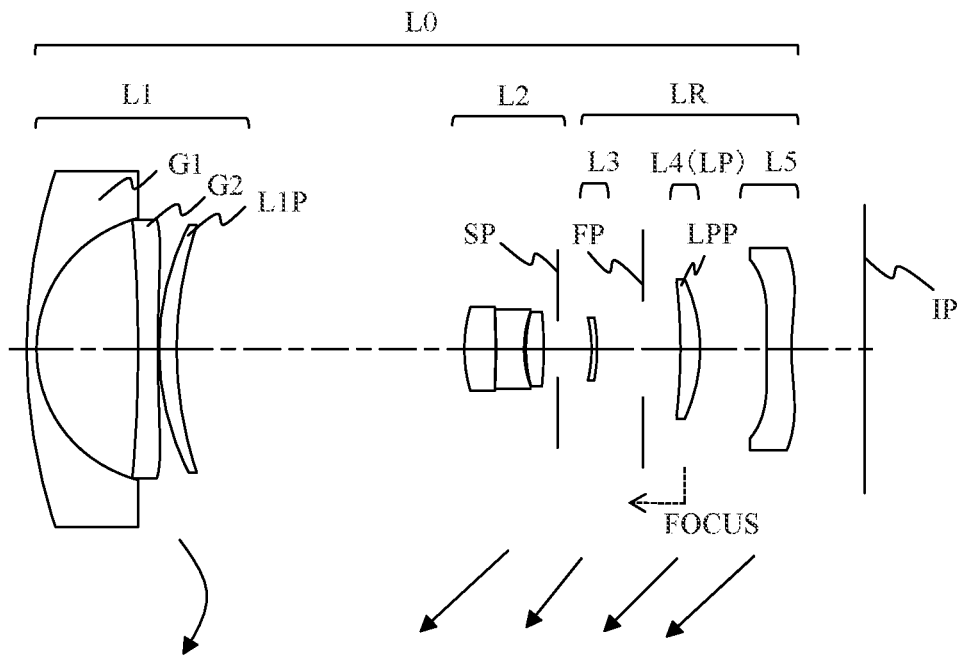
FIG. 9 is a lens sectional view of a zoom lens according to Example 5.
Figure 10A:
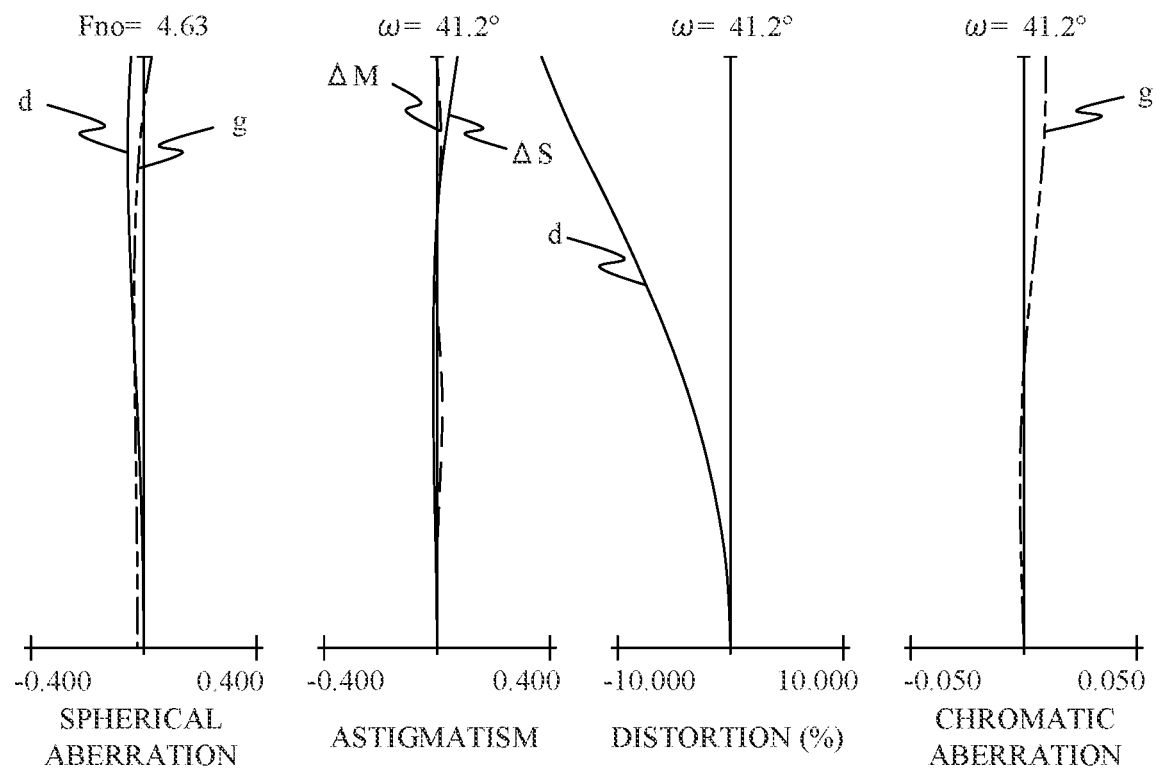
FIGS. 10A to 10C are aberration diagrams of the zoom lens according to Example 5.
Figure 10B:
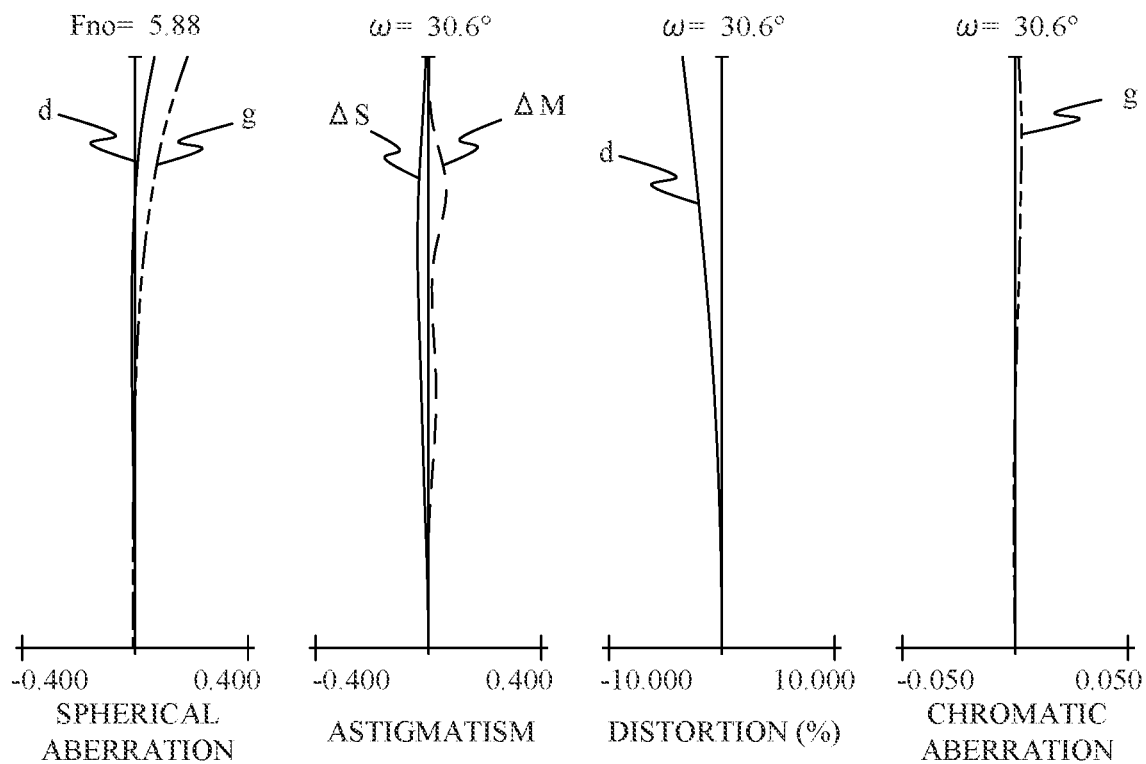
Figure 10C:
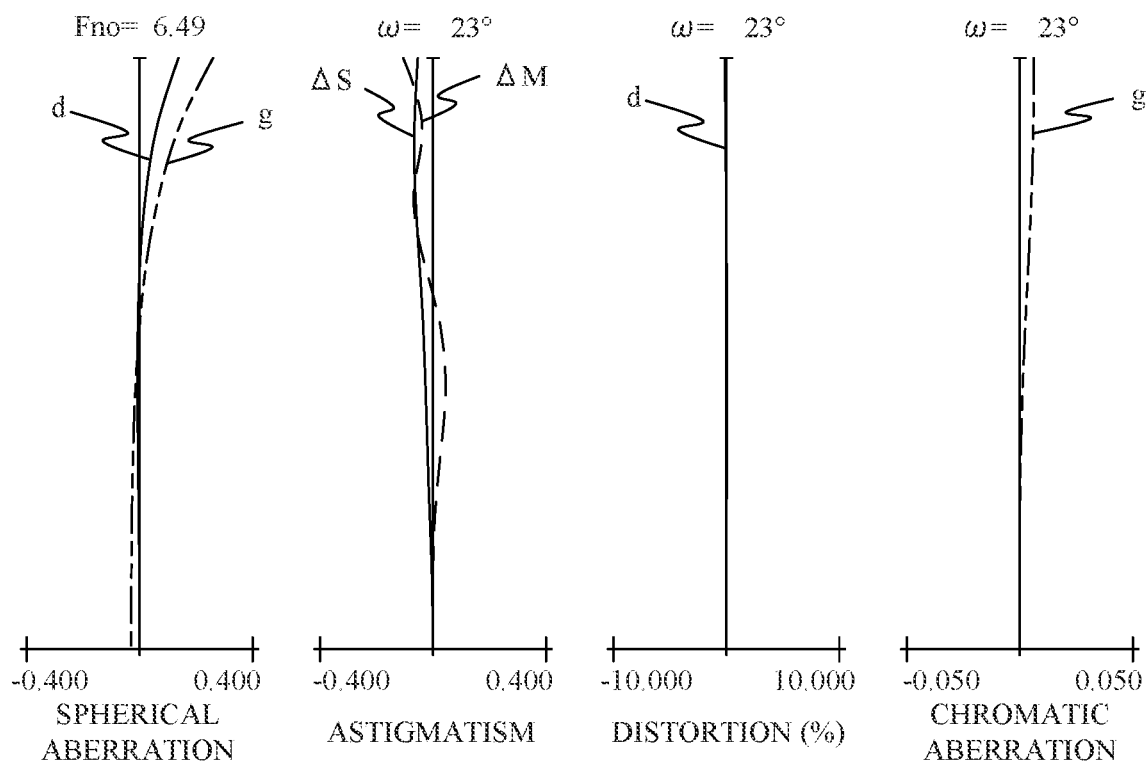
Figure 11:
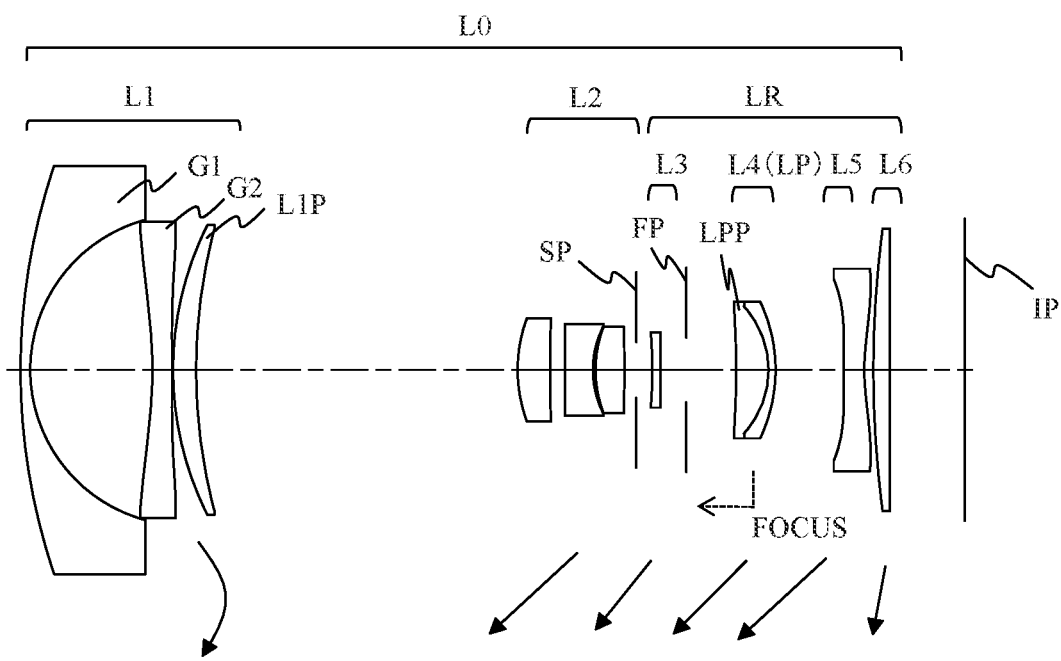
FIG. 11 is a lens sectional view of a zoom lens according to Example 6.
Figure 12A:
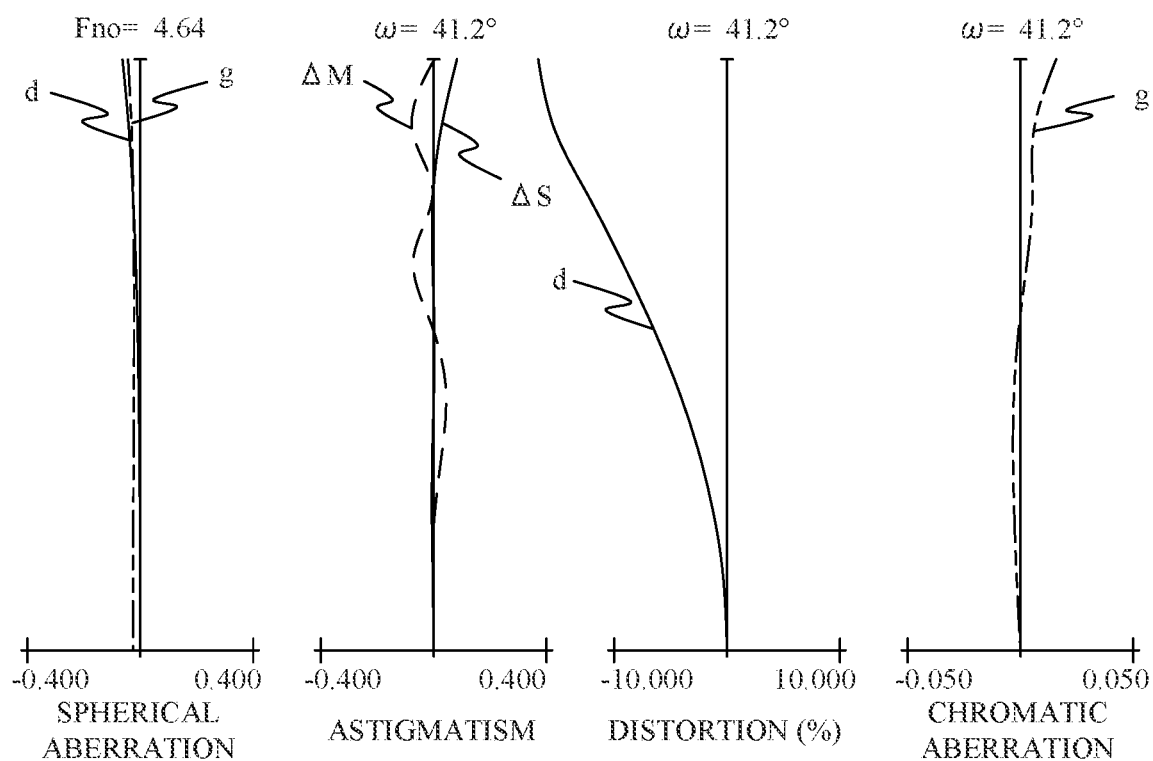
FIGS. 12A to 12C are aberration diagrams of the zoom lens according to Example 6.
Figure 12B:
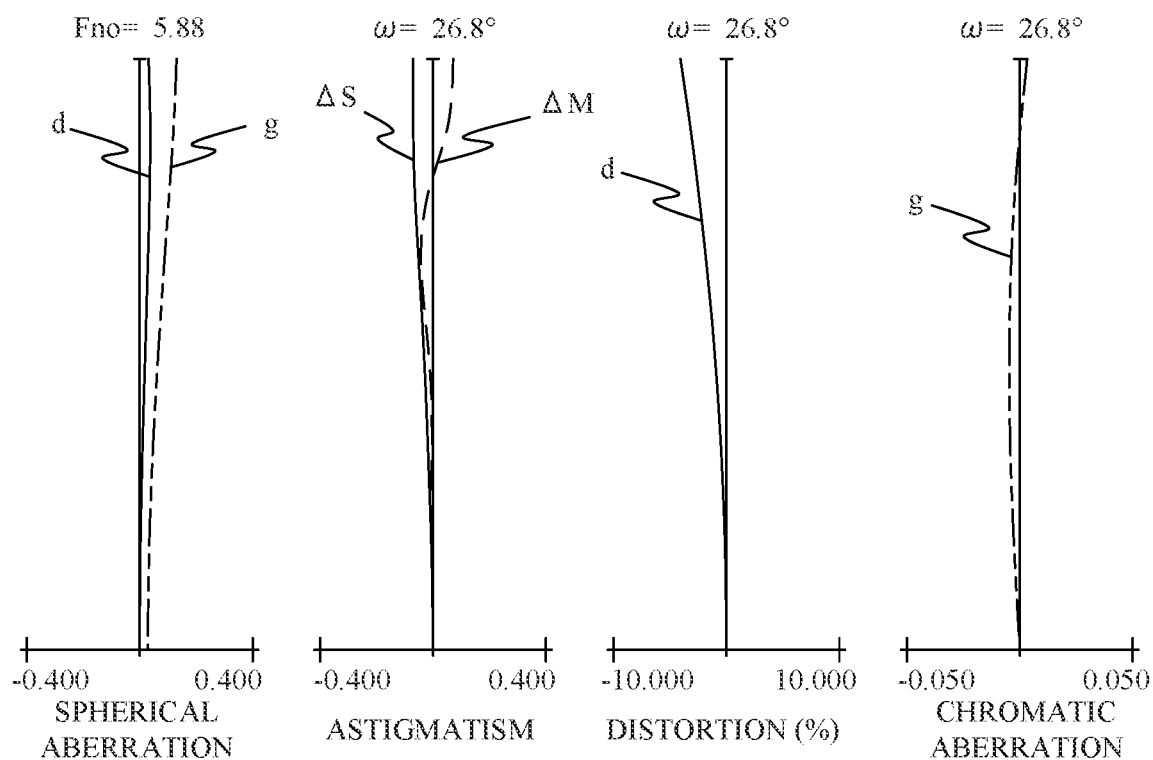
Figure 12C:
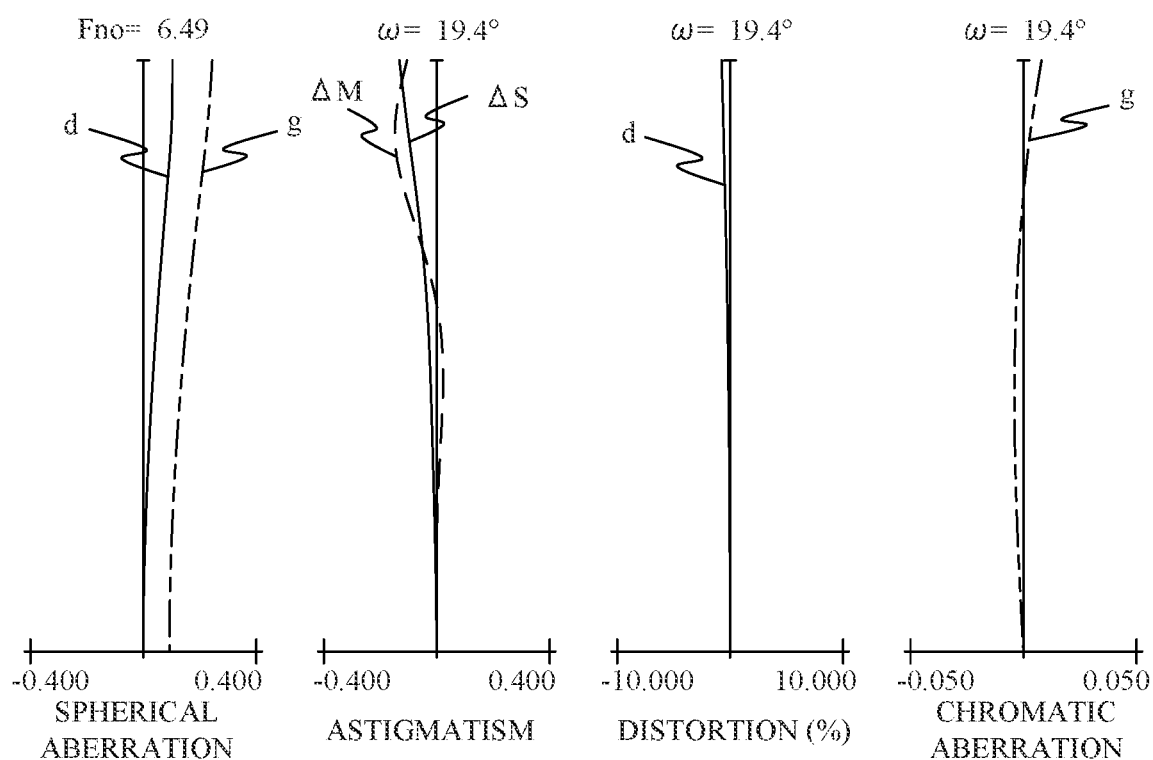

Referring now to the accompanying drawings, a description will be given of embodiments of a zoom lens and an image pickup apparatus according to the disclosure.

FIGS. 1, 3, 5, 7, 9, and 11 are sectional views of zoom lenses L0 according to Examples 1 to 6, respectively, in an in-focus state at infinity at a wide-angle end. The zoom lens L0 according to each example is used for an optical apparatus including an image pickup apparatus, such as a digital video camera, a digital still camera, a broadcasting camera, a film-based camera, and a surveillance camera, and an interchangeable lens.

In each lens sectional view, a left side is an object side and a right side is an image side. The zoom lens L0 according to each example includes a plurality of lens units. The lens unit in the specification of this application is an element of the zoom lens L0 which includes one or more lenses. The lens unit may include an aperture stop (diaphragm) and a flare cut stop. In the zoom lens L0 according to each example, a distance (interval) between adjacent lens units changes during zooming from the wide-angle end to a telephoto end.

In each lens sectional view, Li denotes an i-th (where i is a natural number) lens unit counted from the object side among the lens units included in the zoom lens L0. SP denotes an aperture stop. FP denotes a flare cut stop for cutting unnecessary light. IP denotes an image plane. In a case where the zoom lens L0 according to each example is used as an imaging optical system of a digital still camera or a digital video camera, an imaging plane of a solid-state image sensor (photoelectric conversion element) such as a CCD sensor or a CMOS sensor is placed there. In a case where the zoom lens L0 according to each example is used for an imaging optical system of a film-based camera, a photosensitive plane corresponding to the film plane is placed on the image plane IP.

A solid arrow illustrated in each lens sectional view simply represents a moving locus of each lens unit during zooming from the wide-angle end to the telephoto end. In the specification of this application, the wide-angle end and the telephoto end refer to zoom positions where each lens unit is mechanically positioned at both ends of the movable range on the optical axis. A dashed arrow illustrated in each lens sectional view simply represents a moving locus of the lens unit during focusing from infinity to a short distance (or close) end.

FIGS. 2A to 2C, 4A to 4C, 6A to 6C, 8A to 8C, 10A to 10C, and 12A to 12C are aberration diagrams of the zoom lenses L0 according to Examples 1 to 6, respectively. Each of the aberration diagrams is illustrated in the in-focus state at infinity, where FIGS. 2A, 4A, 6A, 8A, 10A, and 12A are aberration diagrams at the wide-angle end, FIGS. 2B, 4B, 6B, 8B, 10B, and 12B are aberration diagrams at an intermediate (middle) zoom position, and FIGS. 2C, 4C, 6C, 8C, 10C, and 12C are aberration diagrams at the telephoto end.

In a spherical aberration diagram, Fno denotes an F-number, which indicates spherical aberration amounts for the d-line (wavelength 587.6 nm) and the g-line (wavelength 435.8 nm). In an astigmatism diagram, ΔS indicates an astigmatism amount on a sagittal image plane, and ΔM indicates an astigmatism amount on a meridional image plane. A distortion diagram illustrates a distortion amount for the d-line. A chromatic aberration diagram illustrates a chromatic aberration amount for the g-line. ω is an imaging half angle of view (°), which is an angle of view acquired by the paraxial calculation.

A description will now be given of a characteristic configuration of the zoom lens L0 according to each example.

The zoom lens L0 according to each example includes, in order from the object side to the image side, a first lens unit L1 having negative refractive power, a second lens unit L2 having positive refractive power, and a rear unit LR including one or more lens units. The rear unit LR includes all lens units disposed closer to the image plane than the second lens unit L2. The zoom lens L0 is a zoom lens in which a distance between adjacent lens units changes during zooming. The rear unit LR includes a lens unit LP (focus lens unit) having a positive refractive power and configured to move from the image side to the object side during focusing from infinity to a short-distance end. The first lens unit L1 includes, in order from the object side to the image side, a negative lens G1 (first negative lens) and a negative lens G2 (second negative lens).

The outer diameter of the lens included in the first lens unit L1 is determined by the off-axis light beam at the wide-angle end. Thus, the first lens unit L1 tends to be larger and heavier than other lens units. In order to reduce the weight of the zoom lens, it is effective to reduce the weight of the first lens unit L1. In general, a material having a low refractive index tend to have a small specific gravity. On the other hand, the material having the low refractive index weakens the refractive power and it becomes difficult to reduce the size of the zoom lens and to correct off-axis aberrations such as curvature of field at the wide-angle end.

Accordingly, in the zoom lens L0 according to each example, the focal length of the negative lens G1 and the refractive index of the material (for example, glass material) of the negative lens G1 are properly set. More specifically, the zoom lens L0 according to each example satisfies the following inequalities (1) and (2).

$$0 < fG1/fG2 < 0.42 \quad (1)$$

$$1.40 < ndG1 < 1.69 \quad (2)$$

where fG1 is a focal length of the negative lens G1, fG2 is a focal length of the negative lens G2, and ndG1 is a refractive index of the negative lens G1.

Inequality (1) relates to a ratio of the focal length fG1 of the negative lens G1 to the focal length fG2 of the negative lens G2. In a case where the value is lower than the lower limit of inequality(1), one of the negative lens G1 and the negative lens G2 becomes a positive lens, and the wide-angle scheme becomes difficult. If the absolute value of the focal length of the negative lens G1 becomes excessively smaller than that of the negative lens G2, it may become difficult to achieve both the wide-angle scheme and high performance and thus the lower limit of inequality (1) may be set to a value larger than 0. In a case where the value is higher than the upper limit of inequality(1), the refractive power of the negative lens G1 becomes so weak that it becomes difficult to reduce the size of the zoom lens L0 or the refractive power of the negative lens G2 becomes so strong that it becomes difficult to correct off-axis aberrations such as curvature of field.

Inequality(2) relates to the refractive index ndG1 of the negative lens G1. In a case where the value is lower than the lower limit of inequality (2), the refractive index becomes low and glass materials tend to have a low specific gravity. Although this is effective for reducing the weight of the zoom lens L0, the weight reduction becomes difficult because the refractive power becomes weak. In a case where the value is higher than the upper limit of inequality (2), the specific gravity of the lens increases and weight reduction becomes difficult.

The above configuration can provide a small and lightweight zoom lens having high optical performance over the entire zoom range.

Inequalities (1) and (2) described above may be replaced with the following inequalities (1a) and (2a).

$$0.05 < fG1/fG2 < 0.41 \quad (1a)$$

$$1.50 < ndG1 < 1.67 \quad (2a)$$

Inequalities (1) and (2) may be replaced with the following inequalities (1b) and (2b).

$$0.09 < fG1/fG2 < 0.40 \quad (1b)$$

$$1.55 < ndG1 < 1.65 \quad (2b)$$

Here, the zoom lens L0 according to each example is designed to allow the occurrence of distortion. On the premise that the electronic aberration correction technology that has recently been developed is used, image distortion caused by the distortion can be corrected by this image processing technology. Thus, an imaging optical system having the zoom lens L0 has a designed value for the distortion amount that the zoom lens L0 has. An electronic image captured by the imaging optical system is corrected by image processing in an arbitrary image processing unit (such as a CPU attached to an image pickup apparatus such as a camera body) using the designed value of the distortion amount.

The zoom lens that allows the occurrence of distortion needs no lens for correcting distortion, and it becomes easier to reduce the size and weight of the zoom lens. In particular, by making smaller the effective imaging range (effective image circle diameter) of the image sensor at the wide-angle end than that at the telephoto end, and by correcting the distortion, the diameter of the front lens can be made small.

The zoom lens L0 according to each example may have a function as an image stabilizing optical system by parallel-decentering (moving) part of lens or lens unit in a direction including a component orthogonal to the optical axis (preferably a direction orthogonal to the optical axis) during image stabilization. A parallel plate having substantially no refractive power, such as a low-pass filter and an infrared cut filter, may be disposed between the image plane and the lens disposed closest to the image plane.

A description will now be given of conditions that may be satisfied by the zoom lens L0 according to each example. The zoom lens L0 according to each example may satisfy one or more of the following inequalities (3) to (12).

$$-3.00 < fL1/fL2 < -0.85 \tag{3}$$

$$1.20 < fLP/fL2 < 3.20 \tag{4}$$

$$45 < vdG1 < 95 \tag{5}$$

$$1.40 < ndLPP < 1.65 \tag{6}$$

$$45 < vdLPP < 95 \tag{7}$$

$$1.60 < ndL1P < 2.10 \tag{8}$$

$$15 < vdL1P < 45 \tag{9}$$

$$0.50 < MLP/ML2 < 1.50 \tag{10}$$

$$0.25 < DSPw/TLw < 0.53 \tag{11}$$

$$-3.00 < (G1R2+G1R1)/(G1R2-G1R1) < -0.10 \tag{12}$$

Here, fL1 is a focal length of the first lens unit L1, and fL2 is a focal length of the second lens unit L2. fLP is a focal length of lens unit LP. vdG1 is an Abbe number for the d-line of the negative lens G1. ndLPP is a refractive index for the d-line of the positive lens LPP having the strongest refractive power (the largest refractive power) among positive lenses included in the lens unit LP. Here, the refractive power is expressed by the reciprocal of the focal length, and strong refractive power means that the reciprocal of the focal length is large (the focal length is small). vdLPP is an Abbe number for the d-line of the positive lens LPP having the strongest refractive power (the largest refractive power) among the positive lenses included in the lens unit LP. ndL1P is a refractive index for the d-line of the positive lens L1P having the strongest refractive power (the largest refractive power) among positive lenses included in the first lens unit L1. vdL1P is an Abbe number for the d-line of the positive lens L1P with the strongest refractive power (largest refractive power) among the positive lenses included in the first lens unit L1. MLP is a moving amount of the lens unit LP during zooming from the wide-angle end to the telephoto end in the in-focus state at infinity. The moving amount has a negative sign in a case where the lens unit LP is closer to the object at the telephoto end than at the wide-angle end, and has a positive sign the lens unit LP is closer to the image plane at the telephoto end than at the wide-angle end. ML2 is a moving amount of the second lens unit L2 during zooming from the wide-angle end to the telephoto end. The moving amount has a negative sign in a case where the second lens unit L2 is closer to the object at the telephoto end than at the wide-angle end, and has a positive sign in a case where the second lens unit L2 is closer to the image plane at the telephoto end than at the wide-angle end. DSPw is a distance on the optical axis from the aperture stop SP at the wide-angle end to the image plane IP. TLw is an overall lens length of the zoom lens L0 at the wide-angle end. G1R2 is a radius of curvature of the lens surface on the image side of the negative lens G1, and G1R1 is a radius of curvature on the lens surface on the object side of the negative lens G1.

Inequality(3) relates to a ratio of the focal length fL1 of the first lens unit L1 to the focal length fL2 of the second lens unit L2. In a case where the value is lower than the lower limit of inequality (3), the refractive power of the first lens unit L1 becomes too weak and it becomes difficult to make small the zoom lens L0. On the other hand, in a case where the value is higher than the upper limit of inequality (3), the negative refractive power of the first lens unit L1 becomes too strong to satisfactorily correct off-axis aberrations such as coma and curvature of field generated in the first lens unit L1.

Inequality(4) relates to a ratio of the focal length fLP of the lens unit LP to a focal length fL2 of the second lens unit L2. In a case where the value is lower than the lower limit of inequality (4), the refractive power of the lens unit LP becomes strong and it becomes difficult to suppress variations in various aberrations including spherical aberration associated with focusing. On the other hand, in a case where the value is higher than the upper limit of inequality (4), the refractive power of the lens unit LP becomes weak and the moving amount associated with focusing becomes long.

Inequality(5) relates to an Abbe number vdG1 for the d-line of the negative lens G1. If the value is lower than the lower limit of inequality (5), it becomes difficult to correct lateral chromatic aberration. On the other hand, if the value is higher than the upper limit of inequality (5), the lateral chromatic aberration becomes excessively corrected.

Inequality(6) relates to a refractive index ndLPP for the d-line of the positive lens LPP having the strongest refractive power among the positive lenses included in the lens unit LP. In a case where the value is lower than the lower limit of inequality (6), the refractive index of the positive lens LPP becomes too low and a radius of curvature of the lens surface for obtaining proper refractive power becomes small. It is thus difficult to correct various aberrations including spherical aberration. On the other hand, in a case where the value is higher than the upper limit of inequality (6), the specific gravity of the positive lens LPP tends to increase and the weight reduction becomes difficult.

Inequality(7) relates to the Abbe number vdLPP for the d-line of the positive lens LPP having the strongest refractive power among the positive lenses included in the lens unit LP. If the value is lower than the lower limit of inequality (7), it becomes difficult to correct longitudinal and lateral chromatic aberrations. In a case where the value is higher than the upper limit of inequality (7), the longitudinal and lateral chromatic aberrations become excessively corrected.

Inequality(8) relates to the refractive index ndL1P for the d-line of the positive lens L1P having the strongest refractive power among the positive lenses included in the first lens unit L1. If the value is higher than the upper limit of inequality (8) and the refractive index of the positive lens L1P increases, the Petzval sum of the entire lens system becomes too small and it becomes difficult to correct curvature of field. On the other hand, in a case where the value is lower than the lower limit of inequality (8) and the refractive index of the positive lens L1P becomes low, the Petzval sum of the entire lens system becomes large and it becomes difficult to correct the curvature of field. In addition, the radius of curvature of the lens surface for obtaining proper refractive power becomes small, and it becomes difficult to correct off-axis aberrations such as coma.

Inequality(9) relates to the Abbe number vdL1P for the d-line of the positive lens L1P having the strongest refractive power among the positive lenses included in the first lens unit L1. In a case where the value is lower than the lower limit of inequality (9), it becomes difficult to correct lateral chromatic aberration. On the other hand, if the value is higher than the upper limit of inequality (9), longitudinal and lateral chromatic aberrations are insufficiently corrected.

Inequality (10) relates to a ratio of the moving amount MLP of the lens unit LP during zooming from the wide-angle end to the telephoto end in an in-focus state at infinity to the moving amount ML2 of the second lens unit L2 during zooming from the wide-angle end to the telephoto end. In a case where the value is lower than the lower limit of inequality (10), the moving amount of the second lens unit L2 increases and the overall lens length at the wide-angle end increases. On the other hand, in a case where the value is higher than the upper limit of inequality (10), the moving amount of the second lens unit L2 becomes small and the refractive power of the second lens unit L2 becomes strong in order to obtain the desired zoom ratio. It is thus difficult to suppress variations in various aberrations including spherical aberration associated with zooming.

Inequality (11) relates to a ratio of the distance DSPw on the optical axis from the aperture stop SP at the wide-angle end to the image plane IP and the overall lens length TLw at the wide-angle end. The aperture stop SP disposed at a proper position can easily make small the zoom lens L0 while the diameter of the aperture stop SP is reduced. In a case where the value is lower than the lower limit of inequality (11) and the distance from the aperture stop SP to the image plane IP becomes too short, the outer diameter of the lens disposed closer to the object than the aperture stop SP tends to be large. It is thus difficult to make small the zoom lens L0. On the other hand, in a case where the value is higher than the upper limit of inequality (11) and the distance from the aperture stop SP to the image plane IP becomes too long, the light beam diverged by the first lens unit L1 enters the aperture stop SP without being fully converged. The diameter reduction of the aperture stop SP becomes difficult and it becomes difficult to make small the zoom lens L0.

Inequality (12) relates to the shape of the negative lens G1. In a case where the value is lower than the lower limit of inequality (12), the negative lens G1 has a negative refractive power and thus has a meniscus shape that is convex to the object side and has weak refractive power. Then, since the negative lens G1 cannot realize sufficient refractive power, the refractive power of the lens closer to the image plane than the negative lens G1 becomes stronger and it becomes difficult to correct off-axis aberrations such as curvature of field. On the other hand, in a case where the value is higher than the upper limit of inequality (12), the negative lens G1 takes a biconcave shape or a meniscus shape that is convex to the image side, and the radius of curvature of the surface on the object side of the negative lens G1 becomes small. Then, off-axis aberrations such as the curvature of field occurring on the surface on the object side of the negative lens G1 increase and their corrections become difficult. Alternatively, since the negative lens G1 has a shape having weak refractive power, it becomes difficult to correct the off-axis aberrations such as the curvature of field.

Inequalities (3) to (12) may be replaced with inequalities (3a) to (12a) below.

$$-2.50 < fL1/fL2 < -0.90 \tag{3a}$$

$$1.30 < fLP/fL2 < 3.10 \tag{4a}$$

$$50 < vdG1 < 85 \tag{5a}$$

$$1.45 < ndLPP < 1.63 \tag{6a}$$

$$55 < vdLPP < 90 \tag{7a}$$

$$1.65 < ndL1P < 2.05 \tag{8a}$$

$$18 < vdL1P < 40 \tag{9a}$$

$$0.60 < MLP/ML2 < 1.40 \tag{10a}$$

$$0.28 < DSPw/TLw < 0.51 \tag{11a}$$

$$-2.50 < (G1R2+G1R1)/(G1R2-G1R1) < -0.30 \tag{12a}$$

Inequalities (3) to (12) may be replaced with inequalities (3b) to (12b) below.

$$-2.00 < fL1/fL2 < -0.95 \tag{3b}$$

$$1.40 < fLP/fL2 < 3.05 \tag{4b}$$

$$55 < vdG1 < 75 \tag{5b}$$

$$1.48 < ndLPP < 1.61 \tag{6b}$$

$$65 < vdLPP < 85 \tag{7b}$$

$$1.68 < ndL1P < 2.01 \tag{8b}$$

$$20 < vdL1P < 35 \tag{9b}$$

$$0.70 < MLP/ML2 < 1.30 \tag{10b}$$

$$0.30 < DSPw/TLw < 0.50 \tag{11b}$$

$$-2.00 < (G1R2+G1R1)/(G1R2-G1R1) < -0.50 \tag{12b}$$

A description will now be given of a configuration that may be satisfied by the zoom lens L0 according to each example.

The first lens unit L1 may include, in order from the object side to the image side, a negative lens G1, a negative lens G2, and a positive lens L1P. This configuration facilitates corrections of off-axis aberrations such as curvature of field at the wide-angle end.

At least one of a lens surface on the object side of the negative lens G2 and a lens surface on the image side of the negative lens G2 may have an aspherical shape. This configuration facilitates corrections of off-axis aberrations, such as coma and curvature of field, at the wide-angle end.

The negative lens G2 may be made of a resin material. Using a resin material for the negative lens G2, which tends to have a large outer diameter, can easily reduce the weight of the zoom lens L0.

Each of the negative lens G1 and the negative lens G2 may have an air gap on the optical axis. This configuration facilitates corrections of off-axis aberrations such as coma and curvature of field.

For image stabilization, parallel decentering (moving) the second lens unit L2 in a direction including a component orthogonal to the optical axis (which may be orthogonal to the optical axis). The second lens unit L2 for converging the light beam and serving as the lens unit for image stabilization can easily make small the lens unit for image stabilization.

The second lens unit L2 may include three lenses or less. This configuration facilitates weight reduction of the zoom lens L0.

The second lens unit L2 may include the aperture stop SP, and the aperture stop SP may be disposed closest to the image plane of the second lens unit L2. Since the light beam is converged on the image side of the second lens unit L2, the size of the aperture stop SP can be easily reduced.

Focusing from infinity to a short-distance end may be performed by moving the lens unit LP having positive refractive power included in the rear unit LR from the image side to the object side. On-axis rays converge on the image side of the second lens unit L2. This configuration facilitates suppressing variations in various aberrations including spherical aberration during focusing.

The lens unit LP may include one meniscus-shaped positive lens element with a concave surface facing the object side. Here, one lens element is a single lens or cemented lens. Making concave the lens surface on the object side of the lens unit LP can relax incident angles of off-axis rays on the lens surface, and facilitate suppressing fluctuations in off-axis aberrations such as curvature of field during focusing.

A detailed description will now be given of the zoom lens L0 according to each example.

Each of the zoom lenses L0 according to Examples 1 and 2 includes a first lens unit L1, a second lens unit L2, a third lens unit L3 having positive refractive power, and a fourth lens unit L4 having negative refractive power. In the zoom lenses L0 according to Examples 1 and 2, the third lens unit L3 and the fourth lens unit L4 correspond to the rear unit LR. During zooming from the wide-angle end to the telephoto end, the first lens unit L1 is moved along a locus that is convex toward the image side, and the second lens unit L2, third lens unit L3, and fourth lens unit L4 are moved monotonously toward the object side. In the zoom lenses L0 according to Examples 1 and 2, the second lens unit L2 and the fourth lens unit L4 are moved integrally (on the same locus) during zooming. The third lens unit L3 corresponds to the lens unit LP having positive refractive power, and moving the third lens unit L3 along the optical axis can provide focusing from an object point at infinity (infinity object) to a short-distance object point.

The zoom lens L0 according to Example 3 includes a first lens unit L1, a second lens unit L2, a third lens unit L3 having positive refractive power, and a fourth lens unit L4 having positive refractive power. In the zoom lens L0 according to Example 3, the third lens unit L3 and the fourth lens unit L4 correspond to the rear unit LR. During zooming from the wide-angle end to the telephoto end, the first lens unit L1 is moved along a locus that is convex toward the image side, and the second lens unit L2, third lens unit L3, and fourth lens unit L4 are monotonously moved toward the object side. In the zoom lens L0 according to Example 3, the second lens unit L2 and the fourth lens unit L4 are moved integrally (on the same locus) during zooming. The third lens unit L3 corresponds to the lens unit LP having positive refractive power, and moving the third lens unit L3 along the optical axis can provide focusing from the infinity object point to the short-distance object point.

The zoom lens L0 according to Example 4 includes a first lens unit L1, a second lens unit L2, a third lens unit L3 having positive refractive power, a fourth lens unit L4 having negative refractive power, and a fifth lens unit L5 having positive refractive power. In the zoom lens L0 according to Example 4, the third lens unit L3, the fourth lens unit L4, and the fifth lens unit L5 correspond to the rear unit LR. During zooming from the wide-angle end to the telephoto end, the first lens unit L1 is moved along a locus that is convex toward the image side, the second lens unit L2, the third lens unit L3, and the fourth lens unit L4 are monotonously moved toward the object side, and the fifth lens unit L5 is moved monotonously toward the image side. In the zoom lens L0 according to Example 4, the second lens unit L2 and the fourth lens unit L4 are moved integrally (on the same locus) during zooming. The third lens unit L3 corresponds to the lens unit LP having positive refractive power, and moving the third lens unit L3 along the optical axis can provide focusing from the infinite object point to the short-distance object point.

The zoom lens L0 according to Example 5 includes a first lens unit L1, a second lens unit L2, a third lens unit L3 having negative refractive power, a fourth lens unit L4 having positive refractive power, and a fifth lens unit L5 having negative refractive power. In the zoom lens L0 according to Example 5, the third lens unit L3, the fourth lens unit L4, and the fifth lens unit L5 correspond to the rear unit LR. During zooming from the wide-angle end to the telephoto end, the first lens unit L1 is moved along a locus that is convex toward the image side, and the second lens unit L2, third lens unit L3, fourth lens unit L4, and fifth lens unit L5 are monotonously moved toward the object side. In the zoom lens L0 according to Example 5, the second lens unit L2 and the fifth lens unit L5 move integrally (on the same locus) during zooming. The fourth lens unit L4 corresponds to the lens unit LP having positive refractive power, and moving the fourth lens unit L4 along the optical axis can provide focusing from the infinity object point to the short-distance object point.

The zoom lens L0 according to Example 6 includes a first lens unit L1, a second lens unit L2, a third lens unit L3 having negative refractive power, a fourth lens unit L4 having positive refractive power, a fifth lens unit L5 having negative refractive power, and a sixth lens unit L6 having positive refractive power. In the zoom lens L0 according to Example 6, the third lens unit L3, the fourth lens unit L4, the fifth lens unit L5, and the sixth lens unit L6 correspond to the rear unit LR. During zooming from the wide-angle end to the telephoto end, the first lens unit L1 is moved along a locus that is convex toward the image side, and the second lens unit L2, third lens unit L3, fourth lens unit L4, fifth lens unit L5, and sixth lens unit L6 are monotonously moved toward the object side. In the zoom lens L0 according to Example 6, the second lens unit L2 and the fifth lens unit L5 are moved integrally (on the same locus) during zooming. The fourth lens unit L4 corresponds to the lens unit LP having positive refractive power, and moving the fourth lens unit L4 along the optical axis can provide focusing from the infinity object point to the short-distance object point.

Numerical examples 1 to 6 corresponding to examples 1 to 6 will be illustrated below.

In surface data in each numerical example, r denotes a radius of curvature of each optical surface, and d (mm) denotes an on-axis distance (distance on the optical axis) between an m-th surface and an (m+1)-th surface, where m is a surface number counted from the light incident side. nd denotes a refractive index for the d-line of each optical element, and vd denotes an Abbe number of the optical element. The Abbe number vd of a certain material is expressed as follows:

$$vd = (Nd-1)/(NF-NC)$$

where Nd, NF, and NC are refractive indexes based on the d-line (587.6 nm), the F-line (486.1 nm), and the C-line (656.3 nm) in the Fraunhofer line, respectively.

In each numerical example, each of d, focal length (mm), F-number, and half angle of view (degrees) has a value in a case where the zoom lens L0 according to each example is in the in-focus state on an object at infinity (infinity object). A "back focus" is a distance on the optical axis from the final lens surface (the lens surface closest to the image plane) to a paraxial image plane in terms of air equivalent length. An "overall lens length" is a length obtained by adding the back focus to a distance on the optical axis from the frontmost surface (lens surface closest to the object) to the final surface of the zoom lens L0. The "lens unit" includes one or more lenses.

In a case where the optical surface is aspherical, an asterisk * is attached to the right side of the surface number. The aspherical shape is expressed as follows: $X=(h^2/R)/[1+\{1-(1+K)(h/R)^2\}^{1/2}]+A4 \times h^4 \pm A6 \times h^6 A8 \times h^8 + A10 \times h^{10} + A12 \times h^{12}$ where X is a displacement amount from a surface vertex in the optical axis direction, h is a height from the optical axis in a direction orthogonal to the optical axis, R is a paraxial radius of curvature, K is a conical constant, A4, A6, A8, A10, and A12 are aspherical coefficients of respective orders. "e±XX" in each aspherical coefficient means "$\times 10^{\pm XX}$."

NUMERICAL EXAMPLE 1

| UNIT: mm | | | | |
|---|---|---|---|---|
| Surface Data | | | | |
| Surface No. | r | d | nd | vd |
| 1 | 238.756 | 1.40 | 1.63854 | 55.4 |
| 2 | 18.479 | 7.21 | | |
| 3* | 994.673 | 3.70 | 1.53110 | 55.9 |
| 4 | 56.399 | 0.30 | | |
| 5 | 28.004 | 3.60 | 1.69895 | 30.1 |
| 6 | 65.231 | (Variable) | | |
| 7 | 21.644 | 3.00 | 1.90366 | 31.3 |
| 8 | −709.102 | 2.60 | | |
| 9 | −102.707 | 0.70 | 1.84666 | 23.9 |
| 10 | 16.164 | 0.37 | | |
| 11 | 26.583 | 2.05 | 1.77250 | 49.6 |
| 12 | −76.939 | 2.00 | | |
| 13(SP) | ∞ | 6.15 | | |
| 14 | ∞ | (Variable) | | |
| 15 | −65.961 | 2.95 | 1.48749 | 70.2 |
| 16 | −21.205 | (Variable) | | |
| 17* | −90.404 | 3.50 | 1.53110 | 55.9 |
| 18* | −1111.779 | (Variable) | | |
| Image Plane | ∞ | | | |

Aspheric Data

3rd Surface

K = 0.00000e+000 A4 = 2.06228e−006 A6 = −3.09541e−009 A8 = 7.24904e−011
A10 = −3.07809e−013 A12 = 9.19241e−016

17th Surface

K = 0.00000e+000 A4 = −1.01775e−004 A6 = 1.71677e−007 A8 = 1.83977e−010
A10 = −1.16025e−011 A12 = 2.80092e−014

18th Surface

K = 0.00000e+000 A4 = −9.00719e−005 A6 = 2.07355e−007 A8 = −1.21619e−010
A10 = −4.95038e−012 A12 = 1.35424e−014

| Various Data ZOOM RATIO 1.96 | | | |
|---|---|---|---|
| | WIDE-ANGLE | MIDDLE | TELEPHOTO |
| Focal Length | 24.71 | 35.01 | 48.53 |
| FNO | 4.63 | 5.66 | 6.48 |
| Half Angle of View (°) | 36.23 | 29.55 | 23.08 |
| Image Height | 18.10 | 19.85 | 20.68 |
| Overall lens length | 105.60 | 98.52 | 99.03 |
| BF | 16.94 | 25.84 | 37.19 |
| d6 | 27.85 | 11.87 | 1.02 |
| d14 | 10.04 | 10.38 | 10.30 |
| d16 | 11.24 | 10.91 | 10.98 |
| d18 | 16.94 | 25.84 | 37.19 |

-continued

| UNIT: mm | | |
|---|---|---|
| Zoom Lens Unit Data | | |
| Lens Unit | Starting Surface | Focal Length |
| 1 | 1 | −40.14 |
| 2 | 7 | 39.51 |
| 3 | 15 | 62.75 |
| 4 | 17 | −185.51 |

NUMERICAL EXAMPLE 2

| UNIT: mm | | | | |
|---|---|---|---|---|
| Surface Data | | | | |
| Surface No. | r | d | nd | vd |
| 1 | 194.836 | 1.40 | 1.63854 | 55.4 |
| 2 | 19.216 | 7.45 | | |
| 3* | 97.731 | 3.30 | 1.53110 | 55.9 |
| 4 | 50.481 | 0.15 | | |
| 5 | 25.378 | 3.36 | 1.74077 | 27.8 |
| 6 | 40.484 | (Variable) | | |
| 7 | 28.994 | 1.78 | 1.95375 | 32.3 |
| 8 | −2837.037 | 4.32 | | |
| 9 | −36.870 | 0.55 | 1.80810 | 22.8 |
| 10 | 26.363 | 0.35 | | |
| 11 | 61.033 | 1.82 | 1.85150 | 40.8 |
| 12 | −30.900 | 2.06 | | |
| 13(SP) | ∞ | (Variable) | | |
| 14 | ∞ | 9.45 | | |
| 15 | −87.219 | 2.77 | 1.48749 | 70.2 |
| 16 | −22.880 | (Variable) | | |
| 17* | −140.744 | 3.55 | 1.53110 | 55.9 |
| 18* | 244.765 | (Variable) | | |
| Image Plane | ∞ | | | |

Aspheric Data

3rd Surface

K = 0.00000e+000 A4 = 1.74257e−006 A6 = −2.46696e−009 A8 = 7.75729e−011
A10 = −3.31377e−013 A12 = 8.09051e−016

17th Surface

K = 0.00000e+000 A4 = −8.76708e−005 A6 = 1.10417e−007 A8 = 2.08926e−009
A10 = −3.00779e−011 A12 = 1.05365e−013

18th Surface

K = 0.00000e+000 A4 = −8.05410−e005 A6 = 2.07802e−007 A8 = 2.03128e−010
A10 = −8.66422e−012 A12 = 2.90115e−014

| Various Data ZOOM RATIO 1.96 | | | |
|---|---|---|---|
| | WIDE-ANGLE | MIDDLE | TELEPHOTO |
| Focal Length | 24.72 | 36.55 | 48.52 |
| FNO | 4.64 | 5.88 | 6.49 |
| Half Angle of View (°) | 36.09 | 28.56 | 23.01 |
| Image Height | 18.02 | 19.90 | 20.61 |
| Overall lens length | 108.53 | 98.64 | 98.06 |
| BF | 16.96 | 26.55 | 36.14 |
| d6 | 30.74 | 11.26 | 1.09 |
| d13 | 7.26 | 7.81 | 8.06 |
| d16 | 11.25 | 10.70 | 10.44 |
| d18 | 16.96 | 26.55 | 36.14 |

-continued

| UNIT: mm | | |
|---|---|---|
| Zoom Lens Unit Data | | |
| Lens Unit | Starting Surface | Focal Length |
| 1 | 1 | −44.09 |
| 2 | 7 | 41.43 |
| 3 | 14 | 62.74 |
| 4 | 17 | −167.72 |

NUMERICAL EXAMPLE 3

| UNIT: mm | | | | |
|---|---|---|---|---|
| Surface Data | | | | |
| Surface No. | r | d | nd | vd |
| 1 | 232.845 | 1.40 | 1.62299 | 58.2 |
| 2 | 19.941 | 7.96 | | |
| 3* | 111.062 | 3.30 | 1.53110 | 55.9 |
| 4 | 51.120 | 0.15 | | |
| 5 | 27.285 | 3.28 | 1.85026 | 32.3 |
| 6 | 42.225 | (Variable) | | |
| 7 | 21.725 | 3.96 | 1.95375 | 32.3 |
| 8 | 1131.357 | 2.85 | | |
| 9 | −46.823 | 0.55 | 1.80810 | 22.8 |
| 10 | 20.233 | 0.51 | | |
| 11 | 60.580 | 1.70 | 1.80400 | 46.5 |
| 12 | −36.758 | 1.68 | | |
| 13(SP) | ∞ | (Variable) | | |
| 14 | ∞ | 5.20 | | |
| 15 | −49.571 | 2.22 | 1.49700 | 81.5 |
| 16 | −27.201 | (Variable) | | |
| 17* | 39.782 | 3.43 | 1.53110 | 55.9 |
| 18* | 50.673 | (Variable) | | |
| Image Plane | ∞ | | | |

Aspheric Data

3rd Surface

K = 0.00000e+000 A4 = 1.84216e−006 A6 = 8.01311e−010 A8 = 5.12283e−011
A10 = −2.30863e−013 A12 = 5.59343e−016

17th Surface

K = 0.00000e+000 A4 = −4.36850e−005 A6 = −1.04709e−007 A8 = 1.10943e−009
A10 = −6.81115e−012 A12 = 1.19305e−014

18th Surface

K = 0.00000e+000 A4 = −4.39901e−005 A6 = −9.00326e−008 A8 = 9.46107e−010
A10 = −5.28840e−012 A12 = 9.00245e−015

| Various Data ZOOM RATIO 1.96 | | | |
|---|---|---|---|
| | WIDE-ANGLE | MIDDLE | TELEPHOTO |
| Focal Length | 24.71 | 36.32 | 48.52 |
| FNO | 4.64 | 5.88 | 6.49 |
| Half Angle of View (°) | 36.10 | 28.72 | 23.02 |
| Image Height | 18.02 | 19.90 | 20.62 |
| Overall lens length | 111.00 | 99.87 | 98.01 |
| BF | 16.96 | 26.97 | 36.98 |
| d6 | 34.02 | 12.88 | 1.01 |
| d13 | 14.34 | 17.31 | 17.82 |
| d16 | 7.48 | 4.50 | 3.99 |
| d18 | 16.96 | 26.97 | 36.98 |

-continued

| UNIT: mm | | |
|---|---|---|
| Zoom Lens Unit Data | | |
| Lens Unit | Starting Surface | Focal Length |
| 1 | 1 | −46.24 |
| 2 | 7 | 38.99 |
| 3 | 14 | 117.40 |
| 4 | 17 | 314.18 |

NUMERICAL EXAMPLE 4

| UNIT: mm | | | | |
|---|---|---|---|---|
| Surface Data | | | | |
| Surface No. | r | d | nd | vd |
| 1 | −1120.940 | 1.40 | 1.63854 | 55.4 |
| 2 | 29.481 | 9.39 | | |
| 3* | −105.871 | 3.30 | 1.53110 | 55.9 |
| 4* | −390.341 | 0.15 | | |
| 5 | 37.169 | 5.61 | 2.00100 | 29.1 |
| 6 | 55.239 | (Variable) | | |
| 7 | 22.578 | 3.84 | 1.85150 | 40.8 |
| 8 | −4398.814 | 3.78 | | |
| 9 | −49.047 | 3.04 | 1.76182 | 26.5 |
| 10 | 19.940 | 0.38 | | |
| 11 | 38.988 | 1.70 | 1.77250 | 49.6 |
| 12 | −50.780 | 1.49 | | |
| 13(SP) | ∞ | (Variable) | | |
| 14 | ∞ | 8.31 | | |
| 15 | −60.430 | 2.44 | 1.53775 | 74.7 |
| 16 | −28.373 | (Variable) | | |
| 17* | 27.547 | 3.42 | 1.53110 | 55.9 |
| 18* | 19.381 | (Variable) | | |
| 19 | −476.759 | 2.53 | 1.98612 | 16.5 |
| 20 | −139.384 | (Variable) | | |
| Image Plane | ∞ | | | |

| Aspheric Data |
|---|
| 3rd Surface |

K = 0.00000e+000 A4 = 1.73506e−005 A6 = −5.81504e−008 A8 = 2.33643e−010
A10 = −4.73065e−013 A12 = 3.72284e−016
4th Surface K = 2.78976e+002 A4 = 1.77155e−005 A6 = −5.73090e−008 A8 = 2.47146e−010
A10 = −5.30598e−013 A12 = 4.44306e−016
17th Surface K = 0.00000e+000 A4 = −1.15240e−004 A6 = 1.08980e−007 A8 = 1.09284e−009
A10 = −9.51817e−012 A12 = 2.49887e−014
18th Surface K = 0.00000e+000 A4 = −1.42130e−004 A6 = 2.49994e−007 A8 = 5.94173e−011
A10 = −4.17813e−012 A12 = 1.06545e−014

| Various Data ZOOM RATIO 2.07 | | | |
|---|---|---|---|
| | WIDE-ANGLE | MIDDLE | TELEPHOTO |
| Focal Length | 26.52 | 40.09 | 55.00 |
| FNO | 4.63 | 5.88 | 6.49 |
| Half Angle of View (°) | 34.19 | 26.40 | 20.54 |
| Image Height | 18.02 | 19.90 | 20.61 |
| Overall lens length | 130.02 | 109.61 | 101.49 |
| BF | 11.57 | 11.28 | 11.00 |
| d6 | 47.80 | 18.28 | 1.05 |
| d13 | 12.86 | 15.19 | 14.62 |
| d16 | 4.53 | 2.19 | 2.76 |
| d18 | 2.50 | 11.89 | 21.29 |

-continued

| | UNIT: mm | | |
|---|---|---|---|
| d20 | 11.57 | 11.28 | 11.00 |

| Zoom Lens Unit Data | | |
|---|---|---|
| Lens Unit | Starting Surface | Focal Length |
| 1 | 1 | −66.85 |
| 2 | 7 | 42.89 |
| 3 | 14 | 96.88 |
| 4 | 17 | −144.01 |
| 5 | 19 | 199.00 |

NUMERICAL EXAMPLE 5

| UNIT: mm | | | | |
|---|---|---|---|---|
| Surface Data | | | | |
| Surface No. | r | d | nd | vd |
| 1 | 80.208 | 1.40 | 1.63854 | 55.4 |
| 2 | 19.361 | 14.61 | | |
| 3* | −164.348 | 2.80 | 1.53110 | 55.9 |
| 4* | 253.136 | 0.15 | | |
| 5 | 38.801 | 2.51 | 1.92286 | 20.9 |
| 6 | 55.307 | (Variable) | | |
| 7 | 21.105 | 4.44 | 1.91082 | 35.3 |
| 8 | −157.113 | 0.10 | | |
| 9 | −95.832 | 4.01 | 1.85451 | 25.2 |
| 10 | 15.464 | 0.27 | | |
| 11 | 20.249 | 2.55 | 1.63930 | 44.9 |
| 12 | −54.619 | 1.98 | | |
| 13(SP) | ∞ | (Variable) | | |
| 14 | −20.018 | 0.80 | 1.83481 | 42.7 |
| 15 | −24.304 | (Variable) | | |
| 16 | ∞ | 5.38 | | |
| 17 | −79.509 | 2.82 | 1.49700 | 81.5 |
| 18 | −23.407 | (Variable) | | |
| 19* | 106.844 | 3.57 | 1.53110 | 55.9 |
| 20* | 35.485 | (Variable) | | |
| Image Plane | ∞ | | | |

Aspheric Data

3rd Surface

K = 0.00000e+000 A4 = 8.19088e−006 A6 = −4.23962e−008 A8 = 4.87158e−011
A10 = 2.63400e−013 A12 = −6.28278e−016
4th Surface K = −1.79037e+002 A4 = 6.17666e−006 A6 = −5.09905e−008 A8 = 3.25197e−011
A10 = 3.67841e−013 A12 = −9.82139e−016
19th Surface K = 0.00000e+000 A4 = −1.33629e−004 A6 = 9.73781e−008 A8 = 1.70352e−009
A10 = −1.81236e−011 A12 = 4.81540e−014
20th Surface K = 0.00000e+000 A4 = −1.31273e−004 A6 = 3.10386e−007 A8 = 7.12932e−012
A10 = −5.06314e−012 A12 = 1.39234e−014

| Various Data ZOOM RATIO 2.35 | | | |
|---|---|---|---|
| | WIDE-ANGLE | MIDDLE | TELEPHOTO |
| Focal Length | 20.61 | 33.70 | 48.50 |
| FNO | 4.63 | 5.88 | 6.49 |
| Half Angle of View (°) | 41.17 | 30.56 | 23.03 |
| Image Height | 18.02 | 19.90 | 20.61 |
| Overall lens length | 120.00 | 104.38 | 100.66 |
| BF | 10.49 | 20.91 | 31.34 |
| d6 | 41.21 | 15.16 | 1.01 |

-continued

| UNIT: mm | | | |
|---|---|---|---|
| d13 | 4.86 | 6.13 | 7.40 |
| d15 | 6.56 | 8.20 | 6.82 |
| d18 | 9.48 | 6.58 | 6.69 |
| d20 | 10.49 | 20.91 | 31.34 |

| Zoom Lens Unit Data | | |
|---|---|---|
| Lens Unit | Starting Surface | Focal Length |
| 1 | 1 | −45.32 |
| 2 | 7 | 32.92 |
| 3 | 14 | −148.57 |
| 4 | 16 | 65.65 |
| 5 | 19 | −101.81 |

NUMERICAL EXAMPLE 6

| UNIT: mm | | | | |
|---|---|---|---|---|
| Surface Data | | | | |
| Surface No. | r | d | nd | vd |
| 1 | 91.050 | 1.40 | 1.63854 | 55.4 |
| 2 | 22.276 | 17.49 | | |
| 3* | −59.262 | 2.80 | 1.53110 | 55.9 |
| 4* | −858.745 | 0.15 | | |
| 5 | 46.234 | 3.30 | 1.92286 | 20.9 |
| 6 | 79.048 | (Variable) | | |
| 7 | 21.043 | 4.64 | 1.80400 | 46.5 |
| 8 | 172.624 | 2.15 | | |
| 9 | −5060.863 | 4.00 | 1.73037 | 32.2 |
| 10 | 13.782 | 0.37 | | |
| 11 | 17.389 | 4.12 | 1.75500 | 52.3 |
| 12 | −278.333 | 1.71 | | |
| 13(SP) | ∞ | (Variable) | | |
| 14* | −66.256 | 1.20 | 1.82165 | 24.0 |
| 15 | −282.440 | 3.65 | | |
| 16 | ∞ | (Variable) | | |
| 17 | −129.496 | 4.64 | 1.59522 | 67.7 |
| 18 | −13.532 | 1.00 | 1.72916 | 54.7 |
| 19 | −22.824 | (Variable) | | |
| 20* | 110.948 | 2.98 | 1.53110 | 55.9 |
| 21* | 29.174 | (Variable) | | |
| 22 | 154.476 | 2.41 | 1.98612 | 16.5 |
| 23 | −14900.415 | (Variable) | | |
| Image Plane | ∞ | | | |

| Aspheric Data |
|---|
| 3rd Surface |
| K = 0.00000e+000 A4 = 2.47198e−005 A6 = −8.08847e−008 A8 = 1.65476e−010<br>A10 = −1.37297e−013 A12 = 3.16753e−017 |
| 4th Surface |
| K = −8.61713e+003 A4 = 1.91654e−005 A6 = −6.74993e−008 A8 = 7.58767e−011<br>A10 = 1.07307e−013 A12 = −2.66741e−016 |
| 14th Surface |
| K = 0.00000e+000 A4 = −9.45333e−006 A6 = 1.17313e−007 A8 = −6.37183e−012<br>A10 = 2.95045e−011 A12 = 0.00000e+000 |
| 20th Surface |
| K = 0.00000e+000 A4 = −1.23685e−004 A6 = 4.03138e−007 A8 = 6.98371e−010<br>A10 = −1.74137e−011 A12 = 5.43473e−014 |
| 21st Surface |
| K = 0.00000e+000 A4 = −1.34776e−004 A6 = 5.78897e−007 A8 = −1.36238e−009<br>A10 = −2.66916e−012 A12 = 1.50537e−014 |

-continued

| UNIT: mm | | | |
|---|---|---|---|
| Various Data ZOOM RATIO 2.84 | | | |
|  | WIDE-ANGLE | MIDDLE | TELEPHOTO |
| Focal Length | 20.61 | 39.47 | 58.50 |
| FNO | 4.64 | 5.88 | 6.49 |
| Half Angle of View (°) | 41.17 | 26.75 | 19.41 |
| Image Height | 18.02 | 19.90 | 20.61 |
| Overall lens length | 135.00 | 120.11 | 125.50 |
| BF | 10.49 | 11.09 | 11.70 |
| d6 | 46.04 | 13.39 | 1.02 |
| d13 | 2.30 | 4.06 | 5.83 |
| d16 | 7.15 | 9.97 | 10.76 |
| d19 | 9.71 | 5.12 | 2.57 |
| d21 | 1.30 | 18.46 | 35.61 |
| d23 | 10.49 | 11.09 | 11.70 |

| Zoom Lens Unit Data | | |
|---|---|---|
| Lens Unit | Starting Surface | Focal Length |
| 1 | 1 | −47.50 |
| 2 | 7 | 34.88 |
| 3 | 14 | −105.62 |
| 4 | 17 | 55.50 |
| 5 | 20 | −75.48 |
| 6 | 22 | 155.06 |

Table 1 below summarizes various values in each numerical example.

TABLE 1

|  | Ex. 1 | Ex. 2 | Ex. 3 | Ex. 4 | Ex. 5 | Ex. 6 |
|---|---|---|---|---|---|---|
| fG1 | −31.445 | −33.490 | −35.095 | −44.964 | −40.330 | −46.554 |
| fG2 | −112.730 | −201.481 | −181.813 | −274.637 | −187.194 | −120.000 |
| ndG1 | 1.639 | 1.639 | 1.623 | 1.639 | 1.639 | 1.639 |
| fL1 | −40.136 | −44.094 | −46.240 | −66.855 | −45.322 | −47.499 |
| fL2 | 39.511 | 41.433 | 38.995 | 42.893 | 32.920 | 34.883 |
| fLP | 62.750 | 62.737 | 117.402 | 96.881 | 65.648 | 55.498 |
| v dG1 | 55.38 | 55.38 | 58.16 | 55.38 | 55.38 | 55.38 |
| ndLPP | 1.487 | 1.487 | 1.497 | 1.538 | 1.497 | 1.595 |
| v• dLPP | 70.23 | 70.23 | 81.54 | 74.70 | 81.54 | 67.74 |
| ndL1P | 1.699 | 1.741 | 1.850 | 2.001 | 1.923 | 1.923 |
| v dL1P | 30.130 | 27.790 | 32.270 | 29.134 | 20.881 | 20.881 |
| MLP | −19.992 | −18.374 | −16.538 | −16.456 | −18.059 | −28.381 |
| ML2 | −20.250 | −19.181 | −20.025 | −18.218 | −20.855 | −35.521 |
| DSPw | 50.829 | 34.284 | 49.629 | 48.155 | 43.974 | 46.834 |
| TLw | 105.604 | 91.568 | 111.003 | 130.022 | 120.001 | 135.000 |
| G1R2 | 18.479 | 19.216 | 19.941 | 22.250 | 19.361 | 22.272 |
| G1R1 | 238.756 | 194.836 | 232.845 | −128.744 | 80.208 | 85.085 |
| (1) fG1/fG2 | 0.28 | 0.17 | 0.19 | 0.16 | 0.22 | 0.39 |
| (2) ndG1 | 1.64 | 1.64 | 1.62 | 1.64 | 1.64 | 1.64 |
| (3) fL1/fL2 | −1.02 | −1.06 | −1.19 | −1.56 | −1.38 | −1.36 |
| (4) fLP/fL2 | 1.59 | 1.51 | 3.01 | 2.26 | 1.99 | 1.59 |
| (5) v dG1 | 55.4 | 55.4 | 58.2 | 55.4 | 55.4 | 55.4 |
| (6) ndLPP | 1.487 | 1.487 | 1.497 | 1.538 | 1.497 | 1.595 |
| (7) v dLPP | 70 | 70 | 82 | 75 | 82 | 68 |
| (8) ndL1P | 1.70 | 1.74 | 1.85 | 2.00 | 1.92 | 1.92 |
| (9) vdL1P | 30 | 28 | 32 | 29 | 21 | 21 |
| (10) MLP/ML2 | 0.99 | 0.96 | 0.83 | 0.90 | 0.87 | 0.80 |
| (11) DSPw/TLw | 0.48 | 0.37 | 0.45 | 0.37 | 0.37 | 0.35 |
| (12) (G1R2 + G1R1)/(G1R2 − G1R1) | −1.17 | −1.22 | −1.19 | −0.71 | −1.64 | −1.71 |

Image Pickup Apparatus

Figure 13:
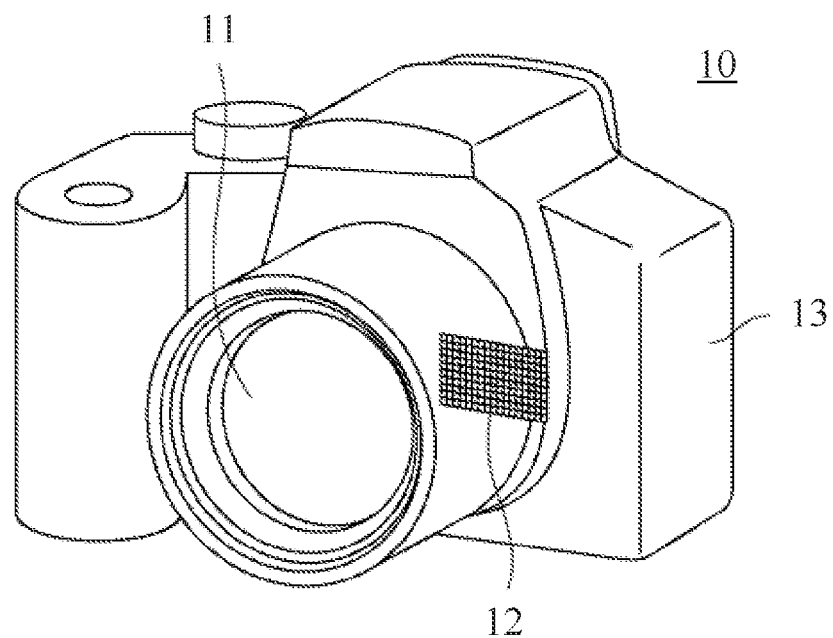
FIG. 13 is a schematic diagram of an image pickup apparatus.

Referring now to FIG. 13, a description will be given of an example of a digital still camera (image pickup apparatus) using the zoom lens L0 according to the disclosure as an imaging optical system. FIG. 13 is a schematic diagram of the image pickup apparatus (digital still camera) 10 according to this example. The image pickup apparatus 10 includes a camera body 13, a zoom lens 11 that is similar to any one of Examples 1 to 6 described above, and a light-receiving element (image sensor) 12 provided in the camera body 13 and configured to photoelectrically convert an optical image formed by the zoom lens 11. The camera body 13 may be a so-called single-lens reflex camera having a quick turn mirror, or a so-called mirrorless camera without a quick turn mirror.

The image pickup apparatus 10 according to this example includes the small and lightweight zoom lens 11 having high optical performance, and thus can provide high-quality images.

The light-receiving element 12 can use an image sensor such as a CCD or CMOS sensor. At this time, by electrically correcting various aberrations such as distortion and chromatic aberration of an image acquired by the light-receiving element 12, the quality of the output image can be improved.

The zoom lens L0 according to each example described above is applicable not only to the digital still camera illustrated in FIG. 13, but also to a variety of optical apparatuses such as a film-based camera, a video camera, and a telescope.

Imaging System

An imaging system (surveillance camera system) includes the zoom lens L0 according to each example and a control unit that controls the zoom lens L0. In this case, the control unit can control the zoom lens L0 so that each lens unit is moved as described above during zooming, focusing, and image stabilization. At this time, the control unit does not have to be integrated with the zoom lens L0, and the control section may be configured as a separate member from the zoom lens L0. For example, a control unit (control apparatus) remotely disposed from a driving unit that drives each lens of the zoom lens L0 may include a transmission unit that transmits a control signal (command) for controlling the zoom lens L0. This control unit can remotely control the zoom lens L0.

Providing an operation unit such as a controller and buttons for remotely operating the zoom lens L0 to the control unit may control the zoom lens L0 according to an input of the user into the operation unit. For example, the operation unit may include an enlargement button and a reduction button. In this case, the control unit may send a signal to the driving unit of the zoom lens L0 so as to increase the magnification of the zoom lens L0 in a case where the user presses the enlargement button and to decrease the magnification of the zoom lens L0 in a case where the user presses the reduction button.

The imaging system may further include a display unit such as a liquid crystal panel that displays information (moving state) about zoom of the zoom lens L0. The information about the zoom of the zoom lens L0 is, for example, a zoom magnification (zoom state) and a moving amount (movement state) of each lens unit. In this case, the user can remotely operate the zoom lens L0 through the operation unit while viewing information about the zoom of the zoom lens L0 displayed on the display unit. At this time, the display unit and the operation unit may be integrated by adopting a touch panel or the like.

Each example can provide a small and lightweight zoom lens having high optical performance, an image pickup apparatus, and an imaging system.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-000019, filed on Jan. 1, 2022, which is hereby incorporated by reference herein in its entirety.

What is claimed is:

1. A zoom lens comprising, in order from an object side to an image side, a first lens unit having negative refractive power, a second lens unit having positive refractive power, and a rear unit including one or more lens units,
   wherein each distance between adjacent lens units changes during zooming,
   wherein the rear unit includes a focus lens unit having positive refractive power and configured to move from the image side to the object side during focusing from infinity to a short-distance end,
   wherein the first lens unit includes, in order from the object side to the image side, a first negative lens and a second negative lens, and
   wherein the following inequalities are satisfied:

$0 < fG1/fG2 < 0.42;$ $1.40 < ndG1 < 1.69;$ $-3.00 < fL1/fL2 < -0.85;$ and $15 < vdL1P < 45;$ where fG1 is a focal length of the first negative lens, fG2 is a focal length of the second negative lens, ndG1 is a refractive index of the first negative lens, fL1 is a focal length of the first lens unit, fL2 is a focal length of the second lens unit, and vdL1P is an Abbe number of a positive lens having the largest refractive power among positive lenses included in the first lens unit.

2. The zoom lens according to claim 1, wherein the following inequality is satisfied:

$1.20 < fLP/fL2 < 3.20;$ where fLP is a focal length of the focus lens unit, and fL2 is a focal length of the second lens unit.

3. The zoom lens according to claim 1, wherein the following inequality is satisfied:

$45 < vdG1 < 95;$ where vdG1 is an Abbe number of the first negative lens.

4. The zoom lens according to claim 1, wherein the following inequality is satisfied:

$1.40 < ndLPP < 1.65;$ where ndLPP is a refractive index of a positive lens having the largest refractive power among positive lenses included in the focus lens unit.

5. The zoom lens according to claim 1, wherein the following inequality is satisfied:

$45 < vdLPP < 95;$ where vdLPP is an Abbe number of a positive lens having the largest refractive power among positive lenses included in the focus lens unit.

6. The zoom lens according to claim 1, wherein the following inequality is satisfied:

$1.60 < ndL1P < 2.10;$ where ndL1P is a refractive index of a positive lens having the largest refractive power among positive lenses included in the first lens unit.

7. The zoom lens according to claim 1, wherein each of the first negative lens and the second negative lens has an air gap on an optical axis.

8. The zoom lens according to claim 1, wherein the following inequality is satisfied:

$0.50 < MLP/ML2 < 1.50;$ where MLP is a moving amount of the focus lens unit during zooming from a wide-angle end to a telephoto end in an in-focus state at infinity, and ML2 is a moving amount of the second lens unit during zooming from the wide-angle end to the telephoto end in the in-focus state at infinity.

9. The zoom lens according to claim 1, further comprising an aperture stop configured to adjust a light amount, and
wherein the following inequality is satisfied:

$$0.25 < DSPw/TLw < 0.53;$$

where DSPw is a distance on an optical axis from the aperture stop to an image plane at a wide-angle end, and TLw is an overall lens length of the zoom lens at the wide-angle end.

10. The zoom lens according to claim 1, wherein the following inequality is satisfied:

$$-3.00 < (G1R2+G1R1)/(G1R2-G1R1) < -0.10;$$

where G1R2 is a radius of curvature of a lens surface on the image side of the first negative lens, and G1R1 is a radius of curvature of a lens surface on the object side of the first negative lens.

11. The zoom lens according to claim 1, wherein the first lens unit includes, in order from the object side to the image side, the first negative lens, the second negative lens, and a positive lens.

12. The zoom lens according to claim 1, wherein the second negative lens is made of a resin material.

13. The zoom lens according to claim 1, wherein at least one of a lens surface on the object side of the second negative lens and a lens surface on the image side of the second negative lens has an aspheric shape.

14. The zoom lens according to claim 1, wherein the second lens unit includes an aperture stop, and
wherein the aperture stop is disposed closest to an image plane in the second lens unit.

15. The zoom lens according to claim 1, wherein the second lens unit includes three or less lenses.

16. The zoom lens according to claim 1, wherein the focus lens unit includes one meniscus-shaped positive lens element having a concave surface facing the object side.

17. The zoom lens according to claim 1, wherein the second lens unit moves in a direction including a component orthogonal to an optical axis during image stabilization.

18. The zoom lens according to claim 1, wherein the rear unit includes, in order from the object side to the image side, a third lens unit having positive refractive power and a fourth lens unit having negative refractive power.

19. The zoom lens according to claim 1, wherein the rear unit includes, in order from the object side to the image side, a third lens unit having positive refractive power, and a fourth lens unit having positive refractive power.

20. The zoom lens according to claim 1, wherein the rear unit includes, in order from the object side to the image side, a third lens unit having positive refractive power, a fourth lens unit having negative refractive power, and a fifth lens unit having positive refractive power.

21. The zoom lens according to claim 1, wherein the rear unit includes, in order from the object side to the image side, a third lens unit having negative refractive power, a fourth lens unit having positive refractive power, and a fifth lens unit having negative refractive power.

22. The zoom lens according to claim 1, wherein the rear unit includes, in order from the object side to the image side, a third lens unit having negative refractive power, a fourth lens unit having positive refractive power, a fifth lens unit having negative refractive power, and a sixth lens unit having positive refractive power.

23. An image pickup apparatus comprising:
a zoom lens; and
an image sensor configured to receive an image formed by the zoom lens,
wherein the zoom lens includes, in order from an object side to an image side, a first lens unit having negative refractive power, a second lens unit having positive refractive power, and a rear unit including one or more lens units,
wherein each distance between adjacent lens units changes during zooming,
wherein the rear unit includes a focus lens unit having positive refractive power and configured to move from the image side to the object side during focusing from infinity to a short-distance end,
wherein the first lens unit includes, in order from the object side to the image side, a first negative lens and a second negative lens, and
wherein the following inequalities are satisfied:

$$0 < fG1/fG2 < 0.42;$$

$$1.40 < ndG1 < 1.69;$$

$$-3.00 < fL1/fL2 < -0.85; \text{ and}$$

$$15 < vdL1P < 45;$$

where fG1 is a focal length of the first negative lens, fG2 is a focal length of the second negative lens, ndG1 is a refractive index of the first negative lens, fL1 is a focal length of the first lens unit, fL2 is a focal length of the second lens unit, and vdL1P is an Abbe number of a positive lens having the largest refractive power among one or more positive lenses included in the first lens unit.

24. The image pickup apparatus according to claim 23, wherein an effective image circle diameter of the image sensor at a wide-angle end is smaller than that at the telephoto end.

* * * * *